(12) United States Patent
Yassin et al.

(10) Patent No.: US 12,348,640 B2
(45) Date of Patent: Jul. 1, 2025

(54) SYSTEMS, METHODS, AND COMPUTER PROGRAM PRODUCTS FOR PROVIDING IMMUTABLE DIGITAL TESTIMONY

(71) Applicant: ALIBI LLC, Miami, FL (US)

(72) Inventors: Mohammad Saleh Yassin, Miami, FL (US); Carlos Damian Fernandez Chiques, Miami, FL (US)

(73) Assignee: ALIBI LLC, Miami, FL (US)

( * ) Notice: Subject to any disclaimer, the term of this patent is extended or adjusted under 35 U.S.C. 154(b) by 0 days.

(21) Appl. No.: 18/733,533

(22) Filed: Jun. 4, 2024

(65) Prior Publication Data
US 2024/0405997 A1    Dec. 5, 2024

Related U.S. Application Data

(60) Provisional application No. 63/506,185, filed on Jun. 5, 2023.

(51) Int. Cl.
| | |
|---|---|
| H04L 9/32 | (2006.01) |
| H04L 9/00 | (2022.01) |
| H04N 21/2187 | (2011.01) |

(52) U.S. Cl.
CPC .............. *H04L 9/3236* (2013.01); *H04L 9/50* (2022.05); *H04N 21/2187* (2013.01)

(58) Field of Classification Search
CPC ....... H04L 9/3236; H04L 9/50; H04L 9/3239; H04N 21/2187; H04N 21/4223
See application file for complete search history.

(56) References Cited

U.S. PATENT DOCUMENTS 10,855,475 B1 *  12/2020  Leach .................. H04L 9/0637
11,120,013 B2    9/2021  Bates et al.
(Continued)

FOREIGN PATENT DOCUMENTS

| KR | 10-2015-0069249 A | 6/2015 |
|---|---|---|
| KR | 10-2015-0144772 A | 12/2015 |

(Continued)

OTHER PUBLICATIONS

Helms, Jeremy, "Alibi app—Your phone can be a witness on your behalf to help resolve disputes in your favor", Linked in, Jun. 15, 2015, [retrieved on Sep. 4, 2024], Retrieved from: <URL: https://www.linkedin.com/pulse/alibi-app-your-phone-can-witness-behalf-help-resolve-disputes-helms>, 5 pages.

(Continued)

*Primary Examiner* — Taghi T Arani
*Assistant Examiner* — Blake I Narramore
(74) *Attorney, Agent, or Firm* — Merchant & Gould P.C.

(57) ABSTRACT

Methods, systems and computer program products are provided for creating and retrieving an immutable digital testimony involving activating a process on a device with a unique identifier and authenticating the creator of an immutable digital testimony using a unique user ID registered with a testimony network. The device activates associated cameras to generate a media stream. Frames are hashed using a selected scheme to create stream hashes, forming a live stream hash, and capturing metadata to be recorded on a blockchain. The stream media and hashing scheme are transmitted to a cloud server for storage, with cloud or distributed file system (DFS) addresses retrieved to determine where the media is saved. The live stream media is encrypted and sent to the DFS, encrypted media addresses are received, and the stream media is saved locally on the device.

22 Claims, 11 Drawing Sheets

(56) References Cited

U.S. PATENT DOCUMENTS

| | | | |
|---|---|---|---|
| 2016/0055322 A1* | 2/2016 | Thomas | H04L 63/0876 |
| | | | 726/7 |
| 2018/0121635 A1* | 5/2018 | Tormasov | H04L 9/3236 |
| 2019/0045034 A1* | 2/2019 | Alam | H04L 12/5692 |
| 2019/0102782 A1* | 4/2019 | Diehl | G06F 21/16 |
| 2019/0236285 A1* | 8/2019 | Cantrell | H04L 9/3226 |
| 2020/0092292 A1* | 3/2020 | Patel | G06F 21/10 |
| 2021/0233204 A1 | 7/2021 | Alattar et al. | |
| 2021/0314658 A1 | 10/2021 | Ye et al. | |
| 2021/0390533 A1* | 12/2021 | Fan | G06Q 20/3825 |
| 2022/0100736 A1 | 3/2022 | Bates | |
| 2023/0094834 A1* | 3/2023 | Leng | H04N 21/2404 |
| | | | 348/180 |
| 2023/0247233 A1* | 8/2023 | Zheng | H04N 21/2187 |
| | | | 725/146 |
| 2023/0300203 A1* | 9/2023 | Zhu | H04L 67/56 |
| | | | 709/227 |

FOREIGN PATENT DOCUMENTS

| | | |
|---|---|---|
| KR | 10-2017-0029759 A | 3/2017 |
| KR | 10-2018-0002204 A | 1/2018 |

OTHER PUBLICATIONS

PCT International Search Report and Written Opinion in Application PCT/US2024/032437, mailed Sep. 30, 2024, 10 pages.

\* cited by examiner

SYSTEMS, METHODS, AND COMPUTER PROGRAM PRODUCTS FOR PROVIDING IMMUTABLE DIGITAL TESTIMONY

CROSS REFERENCE TO RELATED APPLICATIONS

This application claims priority to, and the benefit of, U.S. Provisional Patent Application Ser. No. 63/506,185, filed Jun. 5, 2023, which is hereby incorporated by reference in its entirety.

TECHNICAL FIELD

Example embodiments described herein relate generally to signal processing and blockchain technologies, and more particularly to performing signal processing on various signals to provide immutable digital testimony.

BACKGROUND

There are many situations for which it may be necessary to provide evidence that demonstrates a person is at a place they say they are or were. An alibi, for example, is typically defined as a claim or piece of evidence that one was elsewhere when an act, such as a criminal one, is alleged to have taken place. An alibi defense can have witnesses testify and present evidence at trial to support an alibi defense. Certain industry, government and personal situations may require such evidence outside the criminal context as well.

Evidence of someone's location or alleged conduct can be difficult to prove, however. One person's testimony is often not enough. If the visual evidence and location cannot be proven with a relatively high degree of certainty, then it may not convince those requiring proof of the person's whereabouts and conduct at a particular time (e.g., parent, spouse, employer, government, court, etc.).

Just because a person declaring their whereabouts has evidence to support their claim does not automatically mean that the evidence they present will be accepted. One test evidence must meet, in order to be deemed admissible, is that the evidence must be authentic.

Authentication generally refers to a rule of evidence which requires that evidence must be sufficient to support a finding that the matter in question is what its proponent claims. The "authenticity" rule relates to whether the subject of an evidentiary offering (generally a tangible thing), is what it purports to be. This is a legal way of saying that evidence must be proven to be genuine to be admissible.

Authentication of evidence may be accomplished by technical means such as by presenting logs of mobile device communications obtained from a wireless network provider or by the presenting photographs or videos containing geolocation metadata. However, concerns about the authenticity of such evidence are of great concern. Technology has enabled even children with the ability to alter audio-visual content and related metadata contained in digital files. More concerning, recent advances in artificial intelligence are expected to usher in easier and automated means of altering or computer-generating digital videos and photos.

Typical technologies that attempt to thwart tampering of digital evidence attempt to detect clear indicators of alteration, such as by detecting unusual artifacts and inconsistencies in a digital file, or by embedding "invisible" data (e.g., watermarks, noise, and the like) into the digital file (e.g., an image or audio file). A playback device can then detect alterations of the content in the digital file or embedded data to provide an indication that the evidence has been altered.

However, typical techniques still have one concept in common. They modify the content and hence alter the evidence. Other techniques may not modify the content, but also cannot authenticate that the content has not been modified and hence cannot authenticate the evidence with confidence. Accordingly, one technical problem involves using available technologies, such image capture devices, microphones, GPS, or other types of sensors in a manner to authenticate the content being used as evidence without altering the content. Another technical challenge involves creating a system that enables orchestration of a process for capturing, saving, and communicating over one or more networks, immutable evidence practically and efficiently.

At its core, a blockchain is a distributed ledger that records transactions. A public blockchain typically refers to blockchain that is a distributed public ledger, whereas a private blockchain, which may also be referred to as a managed blockchain, is a permissioned blockchain controlled by a single organization.

Blockchain technologies have been used to prepare media content for authentication by adding a block in a blockchain for a media content file. A block identifier from the blockchain network is generated and used as a watermark payload that is embedded into the content file. Thus, similar to the examples provided above, the evidence is modified.

NFTs, or Non-Fungible Tokens, are cryptographic assets held on a blockchain. Typically, an NFT is a unique digital certificate that functions as proof of ownership, or authenticity, of a digital artwork or asset. It is not the artwork or asset itself. Neither the NFT nor the underlying artwork, however, can be used as immutable evidence of one's location at a particular time.

SUMMARY

The example embodiments described herein meet the above-identified needs by providing methods, systems and computer program products for providing immutable digital testimony.

In an embodiment, a method for creating an immutable digital testimony is provided. The method involves the steps of: activating an immutable digital testimony creation operation on a device having an immutable digital testimony device identifier (ID), wherein the immutable digital testimony device ID is a unique identifier of the device; authenticating a creator of an immutable digital testimony based on an immutable digital testimony creator ID, wherein the immutable digital testimony creator ID is a unique user identification created upon registering with an immutable digital testimony network; capturing the immutable digital testimony device ID of the device used to create the immutable digital testimony; and upon authentication of the creator, initiating by the device, an immutable digital testimony capture operation including: activating one or more cameras associated with the device and causing the device to generate immutable digital testimony stream media, hashing one or more frames of the immutable digital testimony stream media for the one or more cameras by applying a selected immutable digital testimony hashing scheme from a plurality of hashing schemes, thereby creating one or more immutable digital testimony stream hashes, forming a live stream hash from the one or more immutable digital testimony stream hashes, capturing immutable digital testimony metadata to be recorded on an immutable digital testimony authentication blockchain, transmitting the immutable digital testimony stream media and the selected immutable digital testimony hashing scheme by the device to a cloud server, causing the selected immutable digital testimony hashing scheme and the immutable digital testimony stream media to be stored on the cloud server as immutable digital testimony cloud media, retrieving one or more immutable digital testimony addresses, each of the one or more immutable digital testimony addresses being one or more cloud addresses on the cloud server, one or more distributed file system DFS addresses on the DFS, or a combination of i and ii, correspondingly, wherein each of the one or more immutable digital testimony addresses corresponds to a location at which the immutable digital testimony cloud media is saved, the immutable digital testimony cloud media being at least a portion of the immutable digital testimony stream media, upon completion of the transmitting: encrypting the immutable digital testimony live stream media thereby creating encrypted immutable digital testimony live stream media, the encrypted immutable digital testimony live stream media being at least a portion of the immutable digital testimony stream media, sending to the DFS the encrypted immutable digital testimony live stream media to save the encrypted immutable digital testimony live stream media, receiving one or more immutable digital testimony DFS addresses, wherein each of the one or more immutable digital testimony DFS addresses corresponds to a location at which the encrypted immutable digital testimony live stream media has been saved, and saving the immutable digital testimony stream media on the device to create immutable digital testimony local media.

In some embodiments, the method involves: selecting one or more frames of the immutable digital testimony local media corresponding to the same one or more frames of the immutable digital testimony stream media, hashing one or more frames of the selected one or more frames of the immutable digital testimony local media using the selected immutable digital testimony hashing scheme, thereby creating one or more immutable digital testimony local hashes, forming a local symbiotic hash from the one or more immutable digital testimony local hashes, sending, by the device to a smart contract, the local symbiotic hash for validating against the live stream hash, and sending, by the device to the smart contract, the live stream hash, the immutable digital testimony metadata, the one or more immutable digital testimony DFS addresses, and the one or more immutable digital testimony cloud addresses.

In some embodiments, the method involves: selecting one or more frames of the immutable digital testimony cloud media corresponding to the same one or more frames of the immutable digital testimony stream media, hashing one or more frames of the selected one or more frames of the immutable digital testimony cloud media using the selected immutable digital testimony hashing scheme, thereby creating one or more immutable digital testimony cloud hashes, forming a cloud media hash from the one or more immutable digital testimony cloud hashes, and sending, by the cloud server to the smart contract, the cloud media hash for validating against the live stream hash.

In some embodiments, the method further involves creating, by the smart contract, a creator token by combining the immutable digital testimony creator ID and the immutable digital testimony device ID; creating, by the smart contract, an immutable digital testimony identifier (ID) by hashing the creator token with the live stream hash; and comparing, by the smart contract, the live stream hash, the local symbiotic hash, and the cloud media hash, and if a) the live stream hash mirrors the local symbiotic hash and b) the live stream hash mirrors the cloud media hash: creating, by the smart contract, an immutable digital testimony hash by hashing the immutable digital testimony ID, the one or more immutable digital testimony cloud addresses, the immutable digital testimony metadata, the one or more immutable digital testimony DFS addresses, and the live stream hash, recording, by the smart contract: the immutable digital testimony ID, the one or more immutable digital testimony cloud addresses, the immutable digital testimony metadata, the one or more immutable digital testimony DFS addresses, the immutable digital testimony hash, the live stream hash on the immutable digital testimony authentication blockchain, and the user permissions on an immutable digital testimony authentication blockchain, sending the user permissions to an immutable digital testimony orchestrator to create, based on the user permissions, a log entry indicating whether a corresponding immutable digital testimony creator ID has any rights over the immutable digital testimony cloud media that is associated with a specific immutable digital testimony ID, and recording, by the smart contract, the immutable digital testimony ID and immutable digital testimony hash on a public blockchain.

In some embodiments, the method further involves granting, by the smart contract to a requestor, viewing permission to an immutable digital testimony corresponding to the immutable digital testimony ID and registering the viewing permission on an immutable digital testimony authentication blockchain and the immutable digital testimony orchestrator.

In some embodiments, the method involves periodically validating and authenticating the immutable digital testimony authentication blockchain, using the immutable digital testimony hash recorded on the public blockchain.

In some embodiments, the method involves: if a) the live stream hash and the local symbiotic hash do not match or b) the live stream hash and a cloud media hash do not match: creating an alternate immutable digital testimony by saving the immutable digital testimony local media to the DFS and the cloud server and retrieving the one or more alternate immutable digital testimony DFS addresses and the one or more alternate immutable digital testimony cloud addresses, correspondingly, and providing a notification, by the smart contract, that the immutable digital testimony stream media was corrupted during the transmission or storage process.

In some embodiments, the method involves: sending, by the device, the immutable digital testimony metadata, the live stream hash, the local symbiotic hash, the one or more alternate immutable digital testimony cloud addresses, and the one or more alternate immutable digital testimony DFS addresses, to the smart contract.

In some embodiments, the method involves: receiving, by the smart contract, the alternate immutable digital testimony metadata, the live stream hash, the local symbiotic hash, and the one or more alternate immutable digital testimony DFS addresses; creating, by the smart contract, an alternate creator token by combining the immutable digital testimony creator ID and the immutable digital testimony device ID; creating, by the smart contract, an immutable digital testimony alternate identifier (ID) by hashing the alternate creator token with the live stream hash and adding ALT at the end of the immutable digital testimony alternate ID; creating, by the smart contract, the alternate immutable digital testimony hash by hashing the immutable digital testimony alternate ID, the immutable digital testimony metadata, the one or more alternate immutable digital testimony cloud addresses, the one or more alternate immutable digital testimony DFS addresses, the local symbiotic hash, and the live stream hash; recording, by the smart contract, the immutable digital testimony alternate ID, the immutable digital testimony metadata, the one or more alternate immutable digital testimony cloud addresses, the one or more alternate immutable digital testimony DFS addresses, the live stream hash, the local symbiotic hash, and the alternate immutable digital testimony hash to the immutable digital testimony authentication blockchain; recording, by the smart contract, user permissions corresponding to the immutable digital testimony alternate ID on the authentication blockchain and sending the user permissions to an immutable digital testimony orchestrator to update log entries of the immutable digital testimony orchestrator; and recording, by the smart contract, the alternate immutable digital testimony ID and alternate immutable digital testimony hash on the public blockchain.

In some embodiments, the method involves: receiving, by the immutable digital testimony orchestrator, user viewing permissions to an immutable digital testimony corresponding to the immutable digital testimony alternate ID; and creating, by the immutable digital testimony orchestrator, a local ledger of permission details based on the user permissions.

In some embodiments, the method involves: authenticating a third-party immutable digital testimony requestor; initiating, by the third-party immutable digital testimony requestor from an immutable digital testimony creator, a third-party request, the third-party request being any one or more of: an immutable digital testimony request, requesting to create and share a new immutable digital testimony, an immutable digital testimony view request, requesting permission to view an existing immutable digital testimony of the creator, or an immutable digital testimony share request, requesting permission to share an existing immutable digital testimony of the creator with another immutable digital testimony network user; creating, by the device of the third-party immutable digital testimony requestor, the third-party request by combining any one or a combination of: the third-party immutable digital testimony requestor ID, a phone number of an immutable digital creator, and an immutable digital testimony ID, and sending, by the third-party immutable digital testimony requestor, the third-party request to an immutable digital testimony orchestrator.

In some embodiments, the method further involves creating an immutable digital testimony trail that identifies immutable digital testimony created along a path, by: creating, by an immutable digital testimony orchestrator, a map of an immutable digital testimony trail by identifying (i) one or more third-party immutable digital testimonies, (ii) one or more cameras, or (iii) a combination of both (i) and (ii), each along a path taken by a user during a user-predetermined time prior to an immutable digital testimony creation; identifying and visually indicating a location of (i) the one or more third-party immutable digital testimonies, (ii) the one or more cameras, or (iii) a combination of both (i) and (ii); sending the map of the immutable digital testimony trail to a device of a creator of immutable digital testimony, the map to be associated with the immutable digital testimony local media stored on the device of the creator; and recording on the immutable digital testimony authentication blockchain, by the immutable digital testimony orchestrator: the immutable digital testimony trail associated with (i) an immutable digital testimony identifier (ID) and (ii) immutable digital testimony geodata, each associated with the creator of the immutable digital testimony local media, and one or more of an immutable digital testimony identifier corresponding to (i) the one or more third-party immutable digital testimonies, (ii) the one or more cameras, or (iii) both (i) and (ii), correspondingly.

In some embodiments, the method further involves presenting a thumbnail of a specific immutable digital testimony ID on an immutable digital testimony gallery for the creator of the immutable digital testimony; and presenting the immutable digital testimony trail as part of metadata of the immutable digital testimony local media in the immutable digital testimony gallery, wherein any one or a combination of (i) the one or more third-party immutable digital testimonies and (ii) the one or more cameras, each of which allow for the requesting of an immutable digital testimony view are identified with one or more icons, correspondingly; initiating an immutable digital testimony viewing or immutable digital testimony sharing request for a corresponding immutable digital testimony by selecting any of the one or more icons.

In some embodiments, there is provided a system having one or more processors communicatively coupled to a plurality of sensors, and a non-transitory memory, the non-transitory memory storing instructions that when executed by the one or more processor, control the system to create and view an immutable digital testimony, comprising: a first layer, a second layer and a third layer.

The first layer operates on a device having an immutable digital testimony device identifier ID, wherein the immutable digital testimony device ID is a unique identifier of the creator device, the device configured to: activate an immutable digital testimony creation operation; authenticate a creator of an immutable digital testimony based on an immutable digital testimony creator ID, wherein the immutable digital testimony creator ID is a unique user identification created upon registering with an immutable digital testimony network; capture the immutable digital testimony device ID of the device used to create the immutable digital testimony; upon authentication of the creator, initiate an immutable digital testimony capture operation to: activate one or more cameras associated with the device and cause the device to generate immutable digital testimony stream media; hash one or more frames of the immutable digital testimony stream media for the one or more cameras by applying a selected immutable digital testimony hashing scheme from a plurality of hashing schemes, thereby creating one or more immutable digital testimony stream hashes; form a live stream hash from the one or more immutable digital testimony stream hashes; capture immutable digital testimony metadata to be recorded on an immutable digital testimony authentication blockchain; transmit the immutable digital testimony stream media and the selected immutable digital testimony hashing scheme to a cloud server, causing the selected immutable digital testimony hashing scheme and the immutable digital testimony stream media to be stored on the cloud server as immutable digital testimony cloud media; retrieve one or more immutable digital testimony addresses, each of the one or more immutable digital testimony addresses being one or more cloud addresses on the cloud server, one or more distributed file system DFS addresses on the DFS, or a combination of i and ii, correspondingly, wherein each of the one or more immutable digital testimony addresses corresponds to a location at which the immutable digital testimony cloud media is saved, the immutable digital testimony cloud media being at least a portion of the immutable digital testimony stream media; upon completion of the transmission: encrypt the immutable digital testimony live stream media thereby creating encrypted immutable digital testimony live stream media, the encrypted immutable digital testimony live stream media being at least a portion of the immutable digital testimony stream media, send to the DFS the encrypted immutable digital testimony live stream media to save the encrypted immutable digital testimony live stream media, and receive from the DFS one or more immutable digital testimony DFS addresses corresponding to the location on the DFS where the immutable digital testimony stream media is saved, wherein each of the one or more immutable digital testimony DFS addresses corresponds to a location at which the encrypted immutable digital testimony live stream media has been saved; and save the immutable digital testimony stream media on the device, to create immutable digital testimony local media.

In some embodiments, the device is further configured to: select one or more frames of the immutable digital testimony local media corresponding to the same one or more frames of the immutable digital testimony stream media; hash one or more frames of the selected one or more frames of the immutable digital testimony local media using the selected immutable digital testimony hashing scheme, thereby creating one or more immutable digital testimony local hashes; form a local symbiotic hash from the one or more immutable digital testimony local hashes; send to a smart contract, the local symbiotic hash for validating against the live stream hash; and send to the smart contract, the live stream hash, the immutable digital testimony metadata, the one or more immutable digital testimony DFS addresses, and the one or more immutable digital testimony cloud addresses.

In some embodiments the system further involves a third layer configured to: select one or more frames of the immutable digital testimony cloud media corresponding to the same one or more frames of the immutable digital testimony stream media; hash one or more frames of the selected one or more frames of the immutable digital testimony cloud media using the selected immutable digital testimony hashing scheme, thereby creating one or more immutable digital testimony cloud hashes; form a cloud media hash from the one or more immutable digital testimony cloud hashes; and send, from the cloud server to the smart contract, the cloud media hash for validating against the live stream hash.

In some embodiments, the third layer is configured to: create, by the smart contract, a creator token by combining the immutable digital testimony creator ID and the immutable digital testimony device ID; create, by the smart contract, an immutable digital testimony identifier ID by hashing the creator token with the live stream hash; and compare, by the smart contract, the live stream hash, the local symbiotic hash, and the cloud media hash, and if a) the live stream hash mirrors the local symbiotic hash and b) the live stream hash mirrors the cloud media hash: create, by the smart contract, an immutable digital testimony hash by hashing the immutable digital testimony ID, the one or more immutable digital testimony cloud addresses, the immutable digital testimony metadata, the one or more immutable digital testimony DFS addresses, and the live stream hash, record, by the smart contract: the immutable digital testimony ID, the one or more immutable digital testimony cloud addresses, the immutable digital testimony metadata, the one or more immutable digital testimony DFS addresses, the immutable digital testimony hash, the live stream hash on the immutable digital testimony authentication blockchain, and the user permissions on an immutable digital testimony authentication blockchain, send the user permissions to an immutable digital testimony orchestrator to create, based on the user permissions, a log entry indicating whether a corresponding immutable digital testimony creator ID has any rights over the immutable digital testimony cloud media that is associated with a specific immutable digital testimony ID, and record, by the smart contract, the immutable digital testimony ID and immutable digital testimony hash on a public blockchain.

In some embodiments, the third layer is further configured to: if a) the live stream hash and the local symbiotic hash do not match or b) the live stream hash and a cloud media hash do not match: create an alternate immutable digital testimony by saving the immutable digital testimony local media to the DFS and the cloud server and retrieving the one or more alternate immutable digital testimony DFS addresses and the one or more alternate immutable digital testimony cloud addresses, correspondingly, and provide a notification, by the smart contract, that the immutable digital testimony stream media was corrupted during the transmission or storage process.

In some embodiments, the device is further configured to: send the immutable digital testimony metadata, the live stream hash, the local symbiotic hash, the one or more alternate immutable digital testimony cloud addresses, and the one or more alternate immutable digital testimony DFS addresses, to the smart contract.

In some embodiments, the smart contract is further configured to: receive the alternate immutable digital testimony metadata, the live stream hash, the local symbiotic hash, and the one or more alternate immutable digital testimony DFS addresses; create an alternate creator token by combining the immutable digital testimony creator ID and the immutable digital testimony device ID; create an immutable digital testimony alternate identifier (ID) by hashing the alternate creator token with the live stream hash and adding ALT at the end of the immutable digital testimony alternate ID; create the alternate immutable digital testimony hash by hashing the immutable digital testimony alternate ID, the immutable digital testimony metadata, the one or more alternate immutable digital testimony cloud addresses, the one or more alternate immutable digital testimony DFS addresses, the local symbiotic hash, and the live stream hash; record the immutable digital testimony alternate ID, the immutable digital testimony metadata, the one or more alternate immutable digital testimony cloud addresses, the one or more alternate immutable digital testimony DFS addresses, the live stream hash, the local symbiotic hash, and the alternate immutable digital testimony hash to the immutable digital testimony authentication blockchain; record user permissions corresponding to the immutable digital testimony alternate ID on the authentication blockchain and sending the user permissions to an immutable digital testimony orchestrator to update log entries of the immutable digital testimony orchestrator; and record the alternate immutable digital testimony ID and alternate immutable digital testimony hash on the public blockchain.

In some embodiments, the immutable digital testimony orchestrator is configured to: receive user viewing permissions to an immutable digital testimony corresponding to the immutable digital testimony alternate ID, and create a local ledger of permission details based on the user permissions.

In some embodiments, the system further comprising: a requestor device configured to: authenticate a third-party immutable digital testimony requestor; initiate from an immutable digital testimony creator, a third-party request, the third-party request being any one or more of: an immutable digital testimony request, requesting to create and share a new immutable digital testimony, an immutable digital testimony view request, requesting permission to view an existing immutable digital testimony of the creator, or an immutable digital testimony share request, requesting permission to share an existing immutable digital testimony of the creator with another immutable digital testimony network user; create the third-party request by combining any one or a combination of: the third-party immutable digital testimony requestor ID, a phone number of an immutable digital testimony creator, and an immutable digital testimony ID, and send the third-party request to an immutable digital testimony orchestrator.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to methods, systems and computer program products for performing signal processing on various signals to provide immutable digital testimony.

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

"Immutable digital testimony", "IDT", "immutable digital witness" or "IDW" as used herein generally mean digital evidence, testimony, or information that cannot be changed, altered, or tampered with. It ensures the integrity and authenticity of such evidence, testimony, or information by using the techniques described herein to create a verifiable and unchangeable record.

Figure 1:
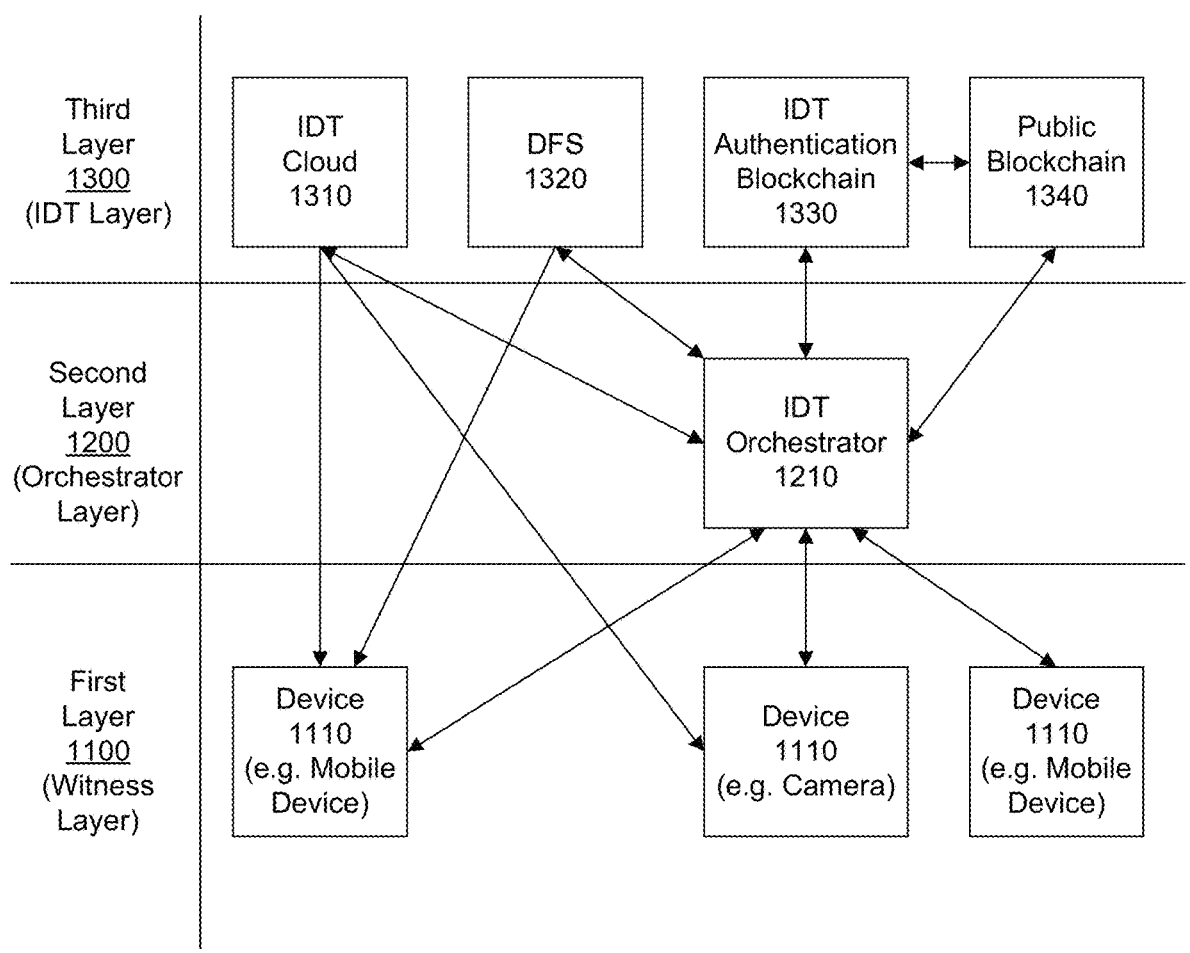
FIG. 1 illustrates an example network for creating and viewing an immutable digital testimony, according to an example embodiment.

FIG. 1 illustrates an example network 100 for creating and viewing an immutable digital testimony, according to an example embodiment. As shown in FIG. 1, in an example implementation, network 100 is comprised of three technical layers that together enable the creation and viewing of immutable digital testimony: a first layer 1100, also referred to as a witness layer 1100, a second layer 1200, also referred to as an orchestrator layer 1200, and a third layer 1300, also referred to as an immutable digital testimony (IDT) layer 1300. The first layer 1100, the second layer 1200, and the third layer 1300 are each a technical layer within a layered model that defines how data is transmitted and processed over the network 100. The layers of network 100 work together to facilitate the seamless creation, storage, and streaming of immutable digital testimonies (IDTs).

In some embodiments, first layer 1100 operates on one or more devices 1110 capable of communicating on network 100, where a device 1110 has an installed on non-transitory medium an application that, when executed by the device 1110, causes the device 1110 to perform one or more of the processes described herein. In an example implementation, a device 1110 is a mobile device having one or more processors and a non-transitory memory for storing the application. In some implementations, a device 1110 is a camera enabled to communicate on network 100. In some implementations, the camera includes one or more processors and a non-transitory memory for storing the application. In some implementations, the camera is communicatively coupled to another device (e.g., a computer, an edge device, and the like) having one or more processors and a non-transitory memory for storing the application. In some embodiments, the one or more devices 1110 include a network of cameras enabled to communicate on network 100.

In some implementations, one or more devices 1110 capture media including audio content and/or video content and communicate the media on network 100.

Second layer 1200 includes an immutable digital testimony (IDT) orchestrator 1210. Generally, IDT orchestrator 1210 manages user permissions, user-to-user messaging, payment processing, and/or system administration. In some embodiments, the second layer 1200 runs on a cloud which can deliver various services over the internet, such as storage, processing power, databases, networking, software, and analytics. In some embodiments, the second layer 1200 runs on a blockchain infrastructure (referred to simply as a "blockchain"). Advantageously, the processes, data, or functionalities associated with embodiments described herein utilize the blockchain, which offer benefits like enhanced security, transparency, and immutability.

The third layer 1300 generally operates to secure authentication and validation keys, execute smart contracts, manage user permissions, host media content, and authorize streaming of the immutable digital testimony. A "smart contract" as used herein generally means a self-executing contract with the terms of an agreement directly written into code. In some embodiments these contracts automatically enforce and execute the terms and conditions when predefined conditions are met, without the need for intermediaries. The smart contracts described herein run on a blockchain, ensuring transparency, security, and immutability. This enables automated, reliable, and transparent transactions and agreements in the applications described herein. In some embodiments, the smart contract is in the IDT layer 1300. An "immutable digital testimony (IDT) authentication blockchain" as used herein generally refers to a blockchain that contains immutable digital testimony related information that is used to validate and authenticate an immutable digital testimony and provide an immutable log and an audit trail related to the creation, viewing, and sharing of immutable digital testimonies. Referring to FIG. 1, in an example implementation, the smart contract resides on IDT authentication blockchain 1330 and operates to validate the integrity of immutable digital testimony (IDT) stream media and record the immutable digital testimony and related information to applicable blockchains (e.g., the IDT authentication blockchain 1330 and a public blockchain 1340).

"Immutable digital testimony (IDT) stream media" as used herein generally refers to media that is transmitted (e.g., streamed, downloaded, or uploaded, or otherwise communicate, as applicable) by a device 1110 (e.g., a mobile device or camera) on network 100. In an example implementation, the IDT stream media is transmitted to IDT cloud 1310.

In some embodiments, immutable digital testimony (IDT) cloud 1310 is a cloud-based media storage system where the IDT stream media and related information are received and stored. IDT stream media and related information received and stored in IDT cloud 1310 becomes immutable digital testimony (IDT) cloud media. In other words, IDT cloud media is media that is stored on the IDT cloud. It should be understood that the IDT cloud and any blockchain described herein is non-transitory media.

A "distributed file system (DFS)" as used herein generally means a decentralized file system, including but not limited to the Interplanetary File System, where the immutable digital testimony related data might be stored for validation or media recovery. A DFS, in some embodiments, is a file system that enables a client device (referred to sometimes simply as a "client") to access file storage from multiple hosts through a computer network as if the client device was accessing local storage. Files are spread across multiple storage servers and in multiple locations, enabling client devices to share data and storage resources.

"Immutable digital testimony (IDT) authentication" as used herein generally means a request by a creator or user of immutable digital testimony (referred to as "an immutable digital testimony (IDT) creator" or simply "creator") to send an authentication of one of its immutable digital testimonies to a specific user (e.g., to a device of the specific user).

"Third-party immutable digital testimony (IDT)" as used herein generally means immutable digital testimony created by an entity other than the immediate user or creator, including another user of, or other device on, the IDT network 100, such as immutable digital testimony cameras, along an immutable digital testimony trail (described below). Such third-party immutable digital testimony is thus created by entities outside of an immediate user or creator.

Referring to FIG. 1, in some embodiments, the third layer 1300 is deployed on a combination of IDT cloud 1310, DFS 1320, IDT authentication blockchain 1330 and a public blockchain 1340.

In an example implementation, a device 1110 includes a plurality of cameras, such as a front camera, a back camera, or any other camera interconnected to the device 1110, configured to capture audio and/or visual content to be used as IDT stream media. The IDT stream media corresponds to the live media while it is in transit to the IDT cloud 1310, where it will be stored and become IDT cloud media.

Figure 2:
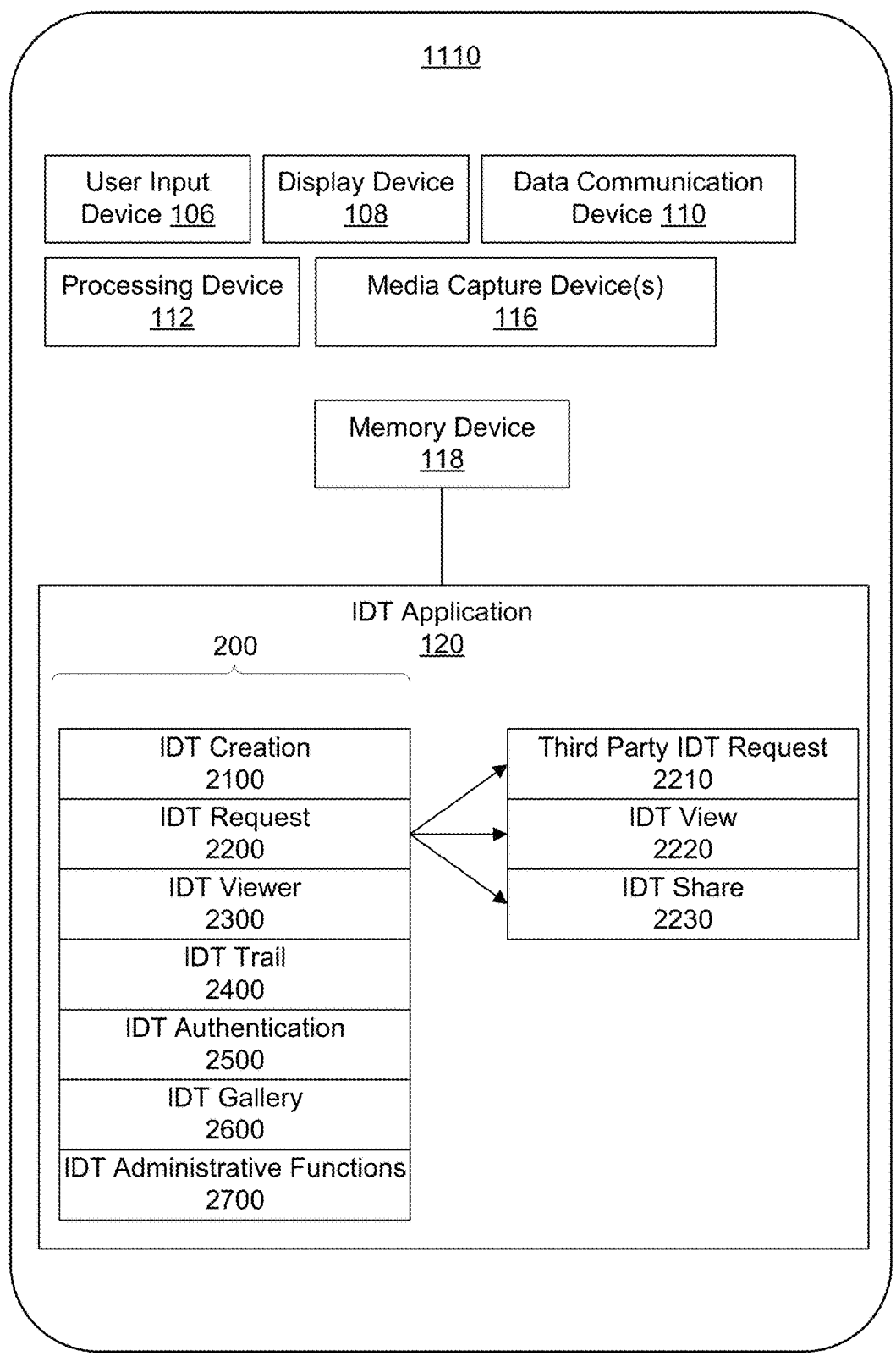
FIG. 2 depicts a device with stored technical processes that collaborate to operate as an immutable digital testimony application executable by the device, according to an example embodiment.

FIG. 2 depicts a device 1110 with stored technical processes 200 that collaborate to operate as an immutable digital testimony application 120 executable by the device, according to an example embodiment. In some embodiments, device 1110 includes a user input device 106, a display device 108, a data communication device 110, a processing device 112, one or more media capture devices 116, and a memory device 118. Aspects of the technical processes 200 are performed locally at the device 1110 via the IDT application 120. Referring also to FIG. 1, certain related processes are performed on the second layer 1200 or the third layer 1300 of network 100. In some embodiments, the IDT application 120 executed on the device 1110 in communication with the IDT cloud 1310, DFS 1320, IDT authentication blockchain 1330 and/or public blockchain 1340 over network 100.

A user input device 106 of device 1110 operates to receive a user input from a user for controlling the device 1110. The user input can include a manual input and/or a voice input, among others. In some embodiments, the user input device 106 includes one or more buttons, keys, touch levers, switches, and/or other mechanical input devices for receiving the input. The user input device 106 can include a touch screen or a gesture input device. In some embodiments, the user input device 106 can detect sounds including the voice input such as a voice of a user (e.g., an utterance) for controlling aspects of a technical processes via the device 1110.

In some embodiments, a display device 108 is provided that operates to display a graphical user interface that displays information for interacting with the device 1110. Examples of such information include an immutable digital testimony trail or immutable digital testimony gallery, both described in more detail below. In some embodiments, the display device 108 is configured as a touch sensitive display and includes the user input device 106 for receiving input from a selector (e.g., a finger, stylus etc.) controlled by a user. In some embodiments, therefore, the display device 108 operates as both a display device and a user input device.

The data communication device 110 operates to enable the device 1110 to communicate with one or more computing devices over one or more networks, such as network 100. For example, the data communication device 110 is configured to communicate with the IDT cloud 1310, DFS 1320, IDT authentication blockchain 1330 and/or public blockchain 1340 over network 100 and receive notifications from the IDT cloud 1310, DFS 1320, IDT authentication blockchain 1330 and/or public blockchain 1340, among other components, via network 100. The data communication device 110 can be a network interface of various types which connects the device 1110 to the network 100.

The processing device 112, in some embodiments, comprises one or more central processing units (CPU). In other embodiments, the processing device 112 additionally or alternatively includes one or more digital signal processors, graphical processing units (GPUs), field-programmable gate arrays, or other electronic circuits.

The media capture device 116, in some embodiments, is one or more cameras integrated with the device 1110. The media capture device 116 is configured to capture media such as audio and/or video. It should be understood that video can include one or more still images as part of its content.

The memory device 118 includes at least some form of non-transitory computer-readable media. Non-transitory computer-readable media includes any available media that can be accessed by the device 1110, such as volatile and nonvolatile, removable and non-removable media implemented in any device configured to store information such as computer readable instructions, data structures, program modules, or other data. Memory device 118 can also include, but is not limited to, random access memory, read only memory, electrically erasable programmable read only memory, flash memory and other memory technology, compact disc read only memory, blue ray discs, digital versatile discs or other optical storage, magnetic storage devices, or any other medium that can be used to store the desired information and that can be accessed by the device 1110 in a non-transitory manner.

The memory device 118 operates to store data and instructions. In some embodiments, the memory device 118 stores instructions for an IDT application 120. In some examples, one or more methods described herein can be implemented as instructions stored in one or more memory devices on one or more computers that, when executed by one or more processors, cause the processors to perform one or more operations described herein.

In some examples, network 100 includes a computer network, an enterprise intranet, the Internet, a LAN, a Wide Area Network (WAN), wireless transmission mediums, wired transmission mediums, satellite transmission mediums, other networks, and combinations thereof. Although network 100 is shown as a single network in FIG. 1, this is shown as an example and the various communications described herein can occur over the same network or a number of different networks.

The technical processes 200 that collaborate to operate as an immutable digital testimony (IDT) application 120 include an immutable digital testimony (IDT) creation process 2100, an immutable digital testimony (IDT) request process 2200, an immutable digital testimony (IDT) viewer process 2300, an immutable digital testimony (IDT) trail process 2400, an immutable digital testimony (IDT) authentication process 2500, an immutable digital testimony (IDT) gallery process 2600, and immutable digital testimony (IDT) administrative functions 2700.

These technical processes 200, in some embodiments, are in the form of instructions that, when executed by one or more processors of a device 1110, cause the device 1110 to perform the applicable operations which are described in more detail herein.

The IDT creation process 2100 generally is a process that creates an immutable digital testimony.

The IDT request process 2200 generally is a process for handling requests for an immutable digital testimony. The IDT request process 2200 can be performed according to different sub-processes, each for a different purpose: a third-party immutable digital testimony (IDT) request process 2210, an immutable digital testimony (IDT) viewing process 2220, and an immutable digital testimony (IDT) sharing request process 2230.

The third-party IDT request process 2210 is a request process initiated by a first client (referred to as an immutable digital testimony (IDT) requestor or simply a requestor) to a second client (referred to as an immutable digital testimony (IDT) creator or simply creator) for initiating a new immutable digital testimony.

The IDT viewing process 2220 generally is a process that receives a request from a requestor initiating a request for an immutable digital testimony (also referred to as an immutable digital testimony (IDT) requestor or simply requestor) to the person who has created one or more immutable digital testimonies (also referred to as an immutable digital testimony (IDT) creator or simply creator) to grant permission to view at least one of the immutable digital testimonies created by the person who created the immutable digital testimony.

The IDT share process 2230 generally is a request via a device operated by a person making the request (also referred to as an immutable digital testimony (IDT) requestor or simply requestor) for a creator who has created one or more immutable digital testimonies (also referred to as an immutable digital testimony (IDT) creator or simply creator) to grant permission, via a device, to share with another user of the network 100 at least one of the immutable digital testimonies created by the creator who created the immutable digital testimony(ies).

The IDT viewer process 2300 generally is a process that performs operations for transmitting (e.g., streaming, downloading, uploading, or otherwise communicating, as applicable) and viewing of immutable digital testimonies.

The IDT trail process 2400 generally is a process that provides (e.g., by presenting via a display of a device) a map identifying a trail along the path a person followed while creating an immutable digital testimony via a device, within a user-determined timeframe. In some embodiments, all third-party immutable digital testimonies that are captured by other persons who created immutable digital testimonies using, e.g., mobile devices, or by cameras enabled to constantly stream to the network 100, are also provided on the map. In an example implementation, each immutable digital testimony has a unique corresponding immutable digital testimony trail which is constructed using immutable digital testimony geodata. "Immutable digital testimony (IDT) geodata" generally means a geolocation audit-trail that identifies the whereabouts of a person who created the immutable digital testimony through one or more devices during a user defined timeframe (e.g., a 60-minutes period). In an example implementation, this can include immutable digital testimony created through one or more devices during a user defined timeframe prior to initiating an immutable digital testimony capture.

The IDT authentication process 2500 generally is a process for authenticating an immutable digital testimony.

The IDT gallery process 2600 generally is a process that displays one or more immutable digital testimonies including, for example, any immutable digital testimony created through a self-initiated immutable digital testimony process or an IDT request process 2200 (e.g., a via third-party IDT request process 2210, IDT viewing process 2220, or IDT sharing request process 2230).

The IDT administrative functions 2700 generally perform various operations related to the administration of immutable digital testimonies.

Figure 3:
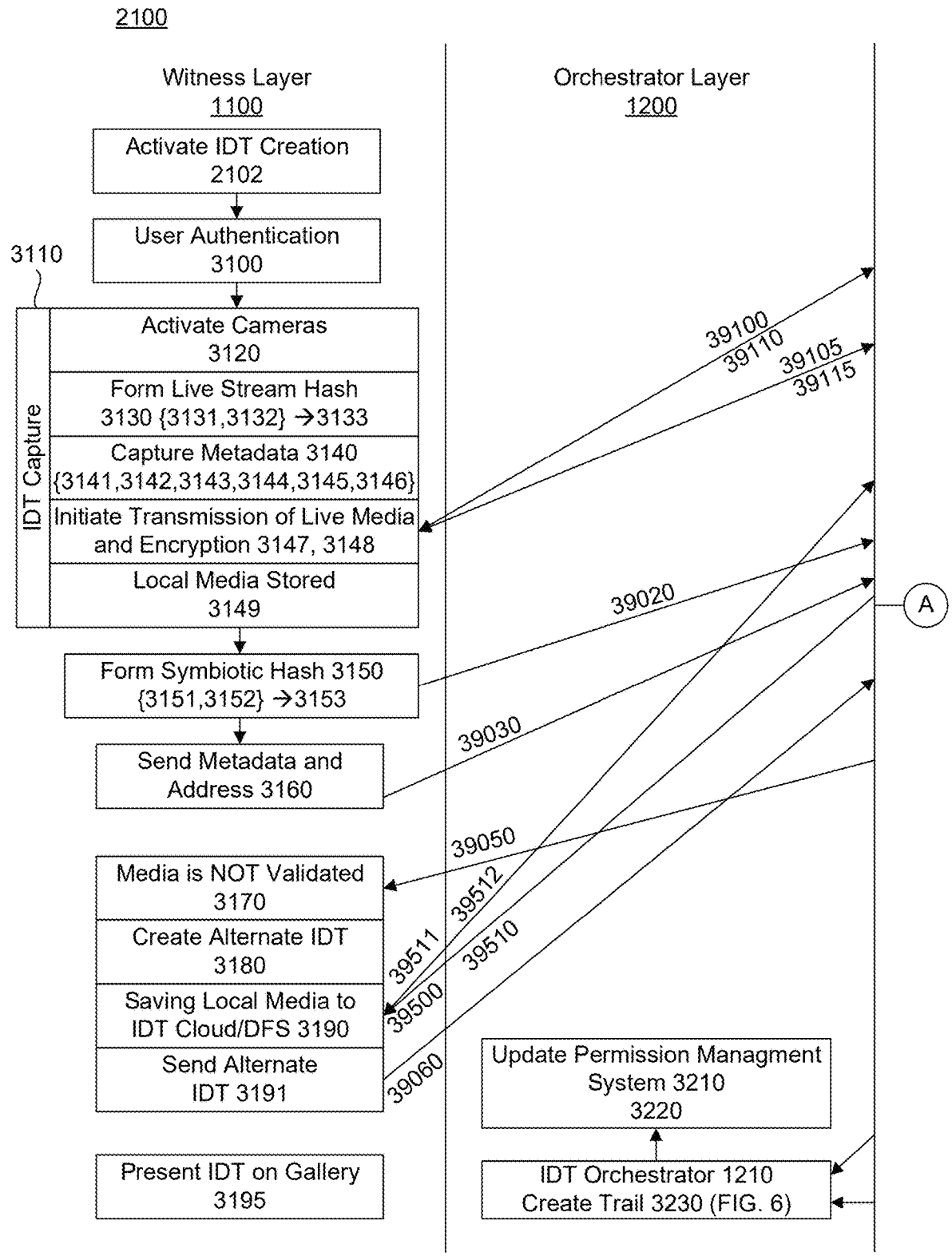
FIG. 3 illustrates a system-flow diagram of an immutable digital testimony creation process, according to an example embodiment.
Figure 3:
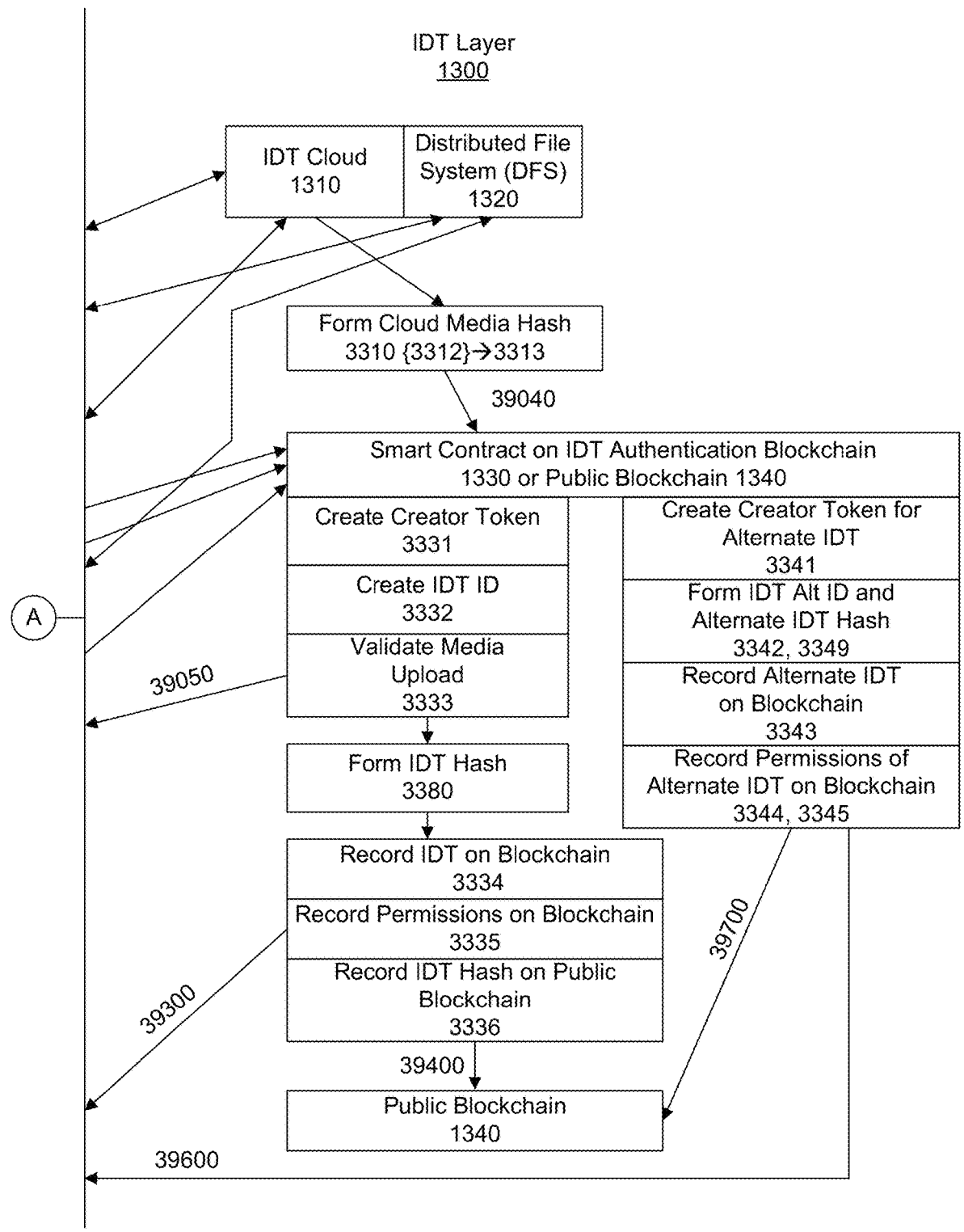

FIG. 3 illustrates a system-flow diagram of an IDT creation process 2100, according to an example embodiment. In some embodiments, the IDT creation process 2100 is performed by the witness layer 1100 (also referred to as the first layer 1100).

In an example implementation, the IDT creation process 2100 begins when an immutable digital testimony creation feature is activated on a device, such as device 1110, as illustrated by activate IDT creation operation 2102. In some embodiments, the IDT creation process 2100 is activated on the device by a user associated with an IDT creator identifier (ID). In some embodiments, the IDT creator ID is a unique user identification that is created upon the IDT creator registering with the network 100.

The device performs a user authentication operation 3100 to authenticate the user. In an example implementation, user authentication operation 3100 performs capturing a device ID and authenticating a user based on the device ID and an IDT creator ID associated with the user. The device ID, in some embodiments, is a unique device identification number, such as the International Mobile Equipment Identity ("IMEI") or similar unique identifier, for the device used to capture the immutable digital testimony.

Upon successful authentication, the device initiates an immutable digital testimony (IDT) capture process 3110. IDT capture process 3110 involves activating available cameras (e.g., one or more cameras) to create IDT stream media, as illustrated by activate cameras operation 3120. The device, in turn, performs a form live stream hash operation 3130. In an example implementation, form live stream hash operation 3130 generates a live stream hash by, for each available camera, hashing each frame of a related IDT stream media 3131 using a selected immutable digital testimony (IDT) frame hashing scheme 3132.

An IDT hashing scheme generally means any one of a variety of schemes for how to hash frames, including among others, for example, dividing individual frames of video into multiple pieces, such as 1 equal part, 2 equal parts, 4 equal parts, 3 unequal parts, into 4 triangles, hashing alternating frames rather than each frame, hashing partial frames rather than complete frames, etc. By assigning an IDT hashing scheme to be used for hashing an IDT stream media, it becomes more difficult for hackers to reverse-engineer the immutable digital testimony validation process and manipulate the media that is stored in the IDT cloud 1310 or DFS 1320. A selected IDT hashing scheme becomes the IDT frame hashing scheme for that immutable digital testimony.

Once the live stream is complete, the IDT stream hashes from each camera are combined or hashed to form the live stream hash 3133.

The device also performs an immutable digital testimony (IDT) metadata capture operation 3140 to capture immutable digital testimony (IDT) metadata. In some embodiments, the IDT metadata includes various truth attestation factors. In an example implementation, truth attestation factors include one or more immutable digital testimony (IDT) creator identifiers (IDs) 3141, one or more device identifiers (IDs) 3142, media metadata 3143, location metadata (3144), an immutable digital testimony (IDT) frame hashing scheme 3145, and an immutable digital testimony (IDT) source code identifier (ID) 3146.

In an example implementation, immutable digital testimony creator identifiers 3141 include: an immutable digital testimony creator ID of a creator, an immutable digital testimony ID method, a name of the user, an e-mail address of the user and one or more validated government identifiers (IDs) of the user. An IDT ID method as used herein generally means the method by which the IDT creator ID was captured. In an example implementation, IDT ID method obtains the IDT creator IDT by using biometric information. In another example implementation, IDT ID method obtains the IDT creator IDT by using manual entry through a device (e.g., user input device 106 of device 1110).

In an example implementation, device identifiers 3142 include: an immutable digital testimony (IDT) device identifier (ID), a phone number (if applicable), a subscriber identity module (SIM) card information (if applicable), an internet protocol (IP) address of the device, a date and time as reported by the device, and a battery level as reported by the device.

In an example implementation, media metadata 3143 includes: Light Detection and Ranging (LiDAR) data for each available camera of a device.

In an example implementation, location metadata 3144 includes latitude, longitude, elevation, and other location identifiers of the device (with the specific IDT device ID that was used when the IDT capture process 3110 was initiated, IDT geodata, and compass and heading of the device associated with the IDT device ID.

It should be understood that in alternative implementations other combinations of metadata can be within the scope of the embodiments herein.

In an example implementation, an immutable digital testimony (IDT) frame hashing scheme 3145 is one or more corresponding immutable digital testimony (IDT) frame hashing schemes associated with the IDT stream media.

In an example implementation, immutable digital testimony (IDT) source code identifier 3146 is an identifier of the code used to create an immutable digital testimony with a specific immutable digital testimony identifier (IDT ID). In some embodiments, IDT source code that was used to create a specific immutable digital testimony is immutable. Being immutable preserves a record of the source code which can be reviewed in the future to ensure there was no malware or manipulation at the moment of the immutable digital testimony creation.

An IDT ID, in some embodiments, is a unique identifier assigned to every immutable digital testimony which is created by hashing a creator token with a live stream hash. In an example implementation, a live stream hash is a hash or combination of all the IDT stream hashes that are used to ensure that corresponding live streamed media was not altered or swapped during a transmission.

Simultaneously with the formation of the live stream hash and the capturing of the immutable digital testimony metadata, the device operates to perform transmitting and saving operation 3147 to transmit and save the IDT stream media and a selected IDT frame hashing scheme to the immutable digital testimony cloud. The selected IDT frame hashing scheme, in some embodiments, is a selected IDT hashing scheme used to hash the IDT stream media prior to it being transmitted to the IDT cloud 1310.

It should be understood that "simultaneously" can mean substantially simultaneously, and either the formation of the live stream hash or the capturing of the immutable digital testimony metadata can occur in different orders, and still be within the same scope of the embodiments herein.

A live stream is transmitted (e.g., streamed, uploaded, downloaded or otherwise communicated by or from a device, such as device 1110, as applicable) to the IDT cloud 1310 and as illustrated by communication operation 39100. In response, IDT cloud 1310 responds to the device causing the device to retrieve a corresponding IDT cloud address, as illustrated by communication operation 39110. An "immutable digital testimony (IDT) cloud address" as used herein generally means the address on the IDT cloud 1310 where IDT stream media and related information are saved, thus becoming the immutable digital testimony cloud media.

Live stream media generally refers to multimedia content that is broadcast in real-time over the internet or a network. This includes live media feeds (including live video and audio feeds) that are transmitted as they are being recorded. Upon completion of the immutable digital testimony transmission, the live stream media which has been cached on the device is encrypted by an encryption operation 3148 and sent to the DFS 1320 as illustrated by communication operation 39105. In response, DFS 1320 returns to the device a corresponding immutable digital testimony (IDT) DFS address as illustrated by communication operation 39115. An "IDT DFS address" as used herein generally means the DFS address of where a live stream media is stored as described herein.

"Immutable digital testimony (IDT) local media" as used herein generally means the IDT stream media that is cached and stored locally on a device, such as device 1110. In some embodiments, for each camera, the IDT stream media on the device is saved to create IDT local media, as illustrated by local media stored operation 3149.

An "immutable digital testimony (IDT) local hash" as used herein generally means a hash that is created for each frame of an IDT local media using a corresponding IDT frame hashing scheme.

A "local symbiotic hash" as used herein generally means a hash or combination of the IDT local hashes that is/are used to compare the IDT stream media and corresponding IDT local media. In some embodiments, the device (e.g., device 1110) performs a local symbiotic hash formation operation 3150 to create a local symbiotic hash 3153 by selecting frames of the IDT local media 3151 and hashing each frame of the IDT local media 3151 to create a so-called "immutable digital testimony (IDT) local hash", using the IDT frame hashing scheme 3152 that was used during the creation of the IDT stream media and to form the IDT media hash. In turn, the device performs a combining or hashing operation to combine or hash the IDT local hashes to form a local symbiotic hash 3153.

The local symbiotic hash is then sent to a smart contract as illustrated by communication operation 39020.

In turn, device 1110 performs a send operation 3160 in conjunction with communication operation 39030 to send the IDT metadata, the live stream hash, the IDT DFS address, and the IDT cloud address to the smart contract.

In some embodiments, a method for creating an immutable digital testimony involves an activate IDT creation operation 2102 to perform activating an immutable digital testimony creation operation on a device 1110 having an immutable digital testimony device identifier (ID), where the immutable digital testimony device ID is a unique identifier of the device 1110. The method further involves a user authentication operation 3100 to perform authenticating a creator of an immutable digital testimony based on an immutable digital testimony creator ID, where the immutable digital testimony creator ID is a unique user identification created upon registering with an immutable digital testimony network. In turn, the method performs an immutable digital testimony (IDT) capture process 3110 to perform capturing the immutable digital testimony device ID of the device used to create the immutable digital testimony, and upon authentication of the creator, initiating by the device, an immutable digital testimony capture operation.

In some embodiments, the IDT capture operation 3110 includes: an activate cameras operation 3120 that performs activating one or more cameras associated with the device and causing the device to generate immutable digital testimony stream media, a form live stream hash operation 3130 to perform hashing one or more frames of the immutable digital testimony stream media for the one or more cameras by applying a selected immutable digital testimony hashing scheme from a plurality of hashing schemes, thereby forming one or more immutable digital testimony stream hashes and forming a live stream hash from the one or more immutable digital testimony stream hashes.

The method further involves an immutable digital testimony (IDT) metadata capture operation 3140 to perform capturing immutable digital testimony metadata to be recorded on an immutable digital testimony authentication blockchain, transmit and communication operations 3147, 39100 to perform transmitting the immutable digital testimony stream media and the selected immutable digital testimony hashing scheme by the device to a cloud server, causing the selected immutable digital testimony hashing scheme and the immutable digital testimony stream media to be stored on the cloud server as immutable digital testimony cloud media.

In turn, the method involves a communication operation 39110 to perform retrieving one or more immutable digital testimony addresses, each of the one or more immutable digital testimony addresses being (i) one or more cloud addresses on the cloud server, (ii) one or more distributed file system (DFS) addresses on the DFS, or (iii) a combination of (i) and (ii), correspondingly, wherein each of the one or more immutable digital testimony addresses corresponds to (i) a location at which the immutable digital testimony cloud media is saved, the immutable digital testimony cloud media being at least a portion of the immutable digital testimony stream media, or (ii) a location allocated for saving the immutable digital testimony cloud media which is at least a portion of the immutable digital testimony stream media. Upon completion of the transmitting the method involves: an encryption operation 3148 to perform encrypting the immutable digital testimony live stream media, thereby creating encrypted immutable digital testimony live stream media, the encrypted immutable digital testimony live stream media being at least a portion of the immutable digital testimony stream media, sending to the DFS the encrypted immutable digital testimony live stream media by a communication operation 39105 to save the encrypted immutable digital testimony live stream media. In turn, the method involves a receiving operation 39015 that causes receiving one or more immutable digital testimony DFS addresses, where each of the one or more immutable digital testimony DFS addresses corresponds to a location at which the encrypted immutable digital testimony live stream media has been saved. A local media stored operation 3149, in turn, performs saving the immutable digital testimony stream media on the device to create immutable digital testimony local media.

The immutable digital testimony metadata, in some embodiments, further comprises any one or a combination of: biometric data of an immutable digital testimony creator, manual entry data of an immutable digital testimony creator, a name of an immutable digital testimony creator, an e-mail address of an immutable digital testimony creator, a validated government identifier of the immutable digital testimony creator, a phone number of the device, SIM card information of the device, a date and time as reported by the device, a battery level as reported by the device, LiDAR data for each of the one or more cameras associated with the device, a location identifier of the device when a camera capture operation was initiated, and other data related to the user, device, location, and media used to create the immutable digital testimony.

In some embodiments, forming the live stream hash is performed by combining or hashing the one or more immutable digital testimony stream hashes. In an example implementation, the combining is performed using a hashing scheme (e.g., Merkle Root).

In some embodiments, the method further involves a local symbiotic hash formation operation 3150 to perform selecting one or more frames of the immutable digital testimony local media corresponding to the same one or more frames of the immutable digital testimony stream media, hashing one or more frames of the selected one or more frames of the immutable digital testimony local media using the selected immutable digital testimony hashing scheme, thereby creating one or more immutable digital testimony local hashes. In turn, the local symbiotic hash creation operation 3150 performs forming a local symbiotic hash from the one or more immutable digital testimony local hashes. A communication operation 39020 performs sending, by the device to a smart contract, the local symbiotic hash for validating against the live stream hash. A send operation 3160 and communication operation 39030 perform sending, by the device to the smart contract, the live stream hash, the immutable digital testimony metadata, the one or more immutable digital testimony DFS addresses, and the one or more immutable digital testimony cloud addresses.

In some embodiments, forming the local symbiotic hash is performed by combining or hashing the one or more immutable digital testimony local hashes. In an example implementation, the combining is performed using a hashing scheme (e.g., Merkle Root).

Referring still to FIG. 3, in some embodiments, IDT cloud 1310 is used to compare the IDT stream media received and IDT cloud media stored on the IDT cloud 1310 to ensure that the media that was streamed from the device was not altered or manipulated by performing a cloud media hash formation operation 3310 to create a cloud media hash. As explained above, in some embodiments, IDT cloud 1310 is on IDT layer 1300.

A "cloud media hash" as used herein generally means a hash or combination of all immutable digital testimony cloud hashes that are used to compare the IDT stream media and the immutable digital testimony cloud media.

An "immutable digital testimony (IDT) cloud hash" generally refers to hashes that are formed for each frame of the IDT cloud media, using the corresponding IDT frame hashing scheme.

Cloud media hash formation operation 3310 performs selecting one or more frames of the IDT cloud media corresponding to the same one or more frames of the IDT stream media. In turn, a hashing operation performs hashing one or more frames of the selected one or more frames of the IDT cloud media using the selected IDT frame hashing scheme to create one or more IDT cloud hashes 3312. In turn, cloud media hash formation operation 3310 performs forming a cloud media hash 3313 from the one or more IDT cloud hashes 3312.

In some embodiments, forming the cloud media hash is performed by combining or hashing the one or more immutable digital testimony cloud hashes. In an example implementation, the combining is performed using a hashing scheme (e.g., Merkle Root).

In turn, a communication operation 39040 performs sending, by the cloud server to the smart contract, the cloud media hash for validating against the live stream hash.

A creator token, generally, is the combination of an IDT user ID and an IDT device ID. Particularly, a smart contract on the IDT authentication blockchain 1330 performs a create token operation 3331 to create the creator token by combining the IDT creator ID and the IDT device ID.

The smart contract, in turn, performs a create immutable digital testimony (IDT) identifier (ID) operation 3332 to create an immutable digital testimony (IDT) identifier (ID) by hashing the creator token with the live stream hash. The smart contract, in some embodiments, performs a validation operation 3333 to validate the IDT cloud media to ensure the same was not corrupted during transmission or saving on the IDT cloud 1310 and/or the DFS 1320, by verifying that there is no difference between the IDT stream media, the IDT local media, and the IDT cloud media. In an example implementation, this is performed by comparing the live stream hash (corresponding to the IDT stream media), the local symbiotic hash (corresponding to the IDT local media), and the cloud media hash (corresponding to the IDT cloud media).

In some embodiments, if a) the live stream hash mirrors the local symbiotic hash and b) the live stream hash mirrors the cloud media hash as shown by validation operation 3333, then the smart contract forms the IDT hash by hashing the IDT ID, IDT metadata, IDT cloud address, IDT DFS address, and the live stream hash as shown by form IDT hash operation 3380.

The smart contract, in turn, performs a record operation 3334 to record the IDT ID, IDT metadata, IDT cloud address, IDT DFS address, live stream hash, and the IDT hash on the IDT authentication blockchain 1330.

In addition, smart contract performs a blockchain recording operation 3335 that performs recording the user permissions on the IDT authentication blockchain 1330 and sending the user permissions to the IDT orchestrator 1210, as shown by communication operation 39300. In some embodiments, this causes the IDT orchestrator 1210 to update a permission management system 3210 as illustrated by update operation 3220. Permission management system 3210, in turn, creates a log entry indicating the specific IDT creator ID that has full rights (viewing and sharing) over the immutable digital testimony associated with a specific IDT ID.

If applicable, blockchain recording operation 3335 also causes the smart contract to grant a third-party IDT requestor (e.g., upon initiating the third-party IDT request process 2210) viewing permissions associated with the specific IDT ID. Blockchain recording operation 3335, in some embodiments, also performs registering the viewing permission on the IDT authentication blockchain 1330 and the permission management system 3210. It should be understood that in some implementations, permission management system 3210 is incorporated in IDT orchestrator 1210.

In some embodiments, the smart contract performs a recording operation 3336 in conjunction with a communication operation 39400 to record the IDT ID and IDT hash on the public blockchain 1340.

The IDT hash that is recorded on the public blockchain 1340 can be used for periodic validation and authentication of IDT authentication blockchain 1330, e.g., the integrity of private blockchain record is validated using the IDT hash stored as a record on the public blockchain 1340.

The IDT DFS address and the corresponding media at that location can, in some embodiments, be used to recreate or reconstruct an immutable digital testimony in case the IDT cloud media is corrupted or altered.

If a determination is made at validation operation 3333 that there is no perfect match between a) the live stream hash and the local symbiotic hash or b) the live stream hash and the cloud media hash, then the smart contract performs a notification operation to notify the immutable digital testimony application 120 that the immutable digital stream media was corrupted during the upload or storage process, as illustrated by communication operation 39050.

Another aspect involves a method for creating a cloud media hash for validating against the live stream hash. The method involves a cloud media hash formation operation 3310 for selecting one or more frames of the IDT cloud media corresponding to the same one or more frames of the IDT stream media. The method further involves hashing one or more frames of the selected one or more frames of the immutable digital testimony cloud media using the selected immutable digital testimony frame hashing scheme, thereby creating one or more IDT cloud hashes 3312. In turn, the method performs forming a cloud media hash 3313 from the one or more immutable digital testimony cloud hashes. A communication operation 39040 then performs sending, by the cloud server to the smart contract, the cloud media hash for validating against the live stream hash.

In some embodiments, forming the cloud media hash 3313 is performed by combining or hashing the one or more immutable digital testimony cloud hashes.

In some embodiments, the method involves a create token operation 3331 for creating, by the smart contract, a creator token by combining the immutable digital testimony creator ID and the IDT device ID.

A create immutable digital testimony identifier operation 3332 performs creating, by the smart contract, an immutable digital testimony identifier (ID) by hashing the creator token with the live stream hash. A validation operation 3333 performs comparing, by the smart contract, the live stream hash, the local symbiotic hash, and the cloud media hash. If validation operation 3333 determines a) the live stream hash mirrors the local symbiotic hash and b) the live stream hash mirrors the cloud media hash, then the method further involves a form IDT hash operation 3380 that performs forming, by the smart contract, an IDT hash by hashing the IDT ID, the one or more IDT cloud addresses, the IDT metadata, the one or more IDT DFS addresses, and the live stream hash.

Blockchain recording operations 3334, 3335 perform, recording, by the smart contract: the IDT ID, the one or more IDT cloud addresses, the IDT metadata, the one or more IDT DFS addresses, the IDT hash, the live stream hash on the IDT authentication blockchain 1330, and the user permissions on an IDT authentication blockchain 1330.

In some embodiments, a communication operation 39300 performs sending the user permissions to an IDT orchestrator 1210 to create, based on the user permissions, a log entry indicating whether a corresponding IDT creator ID has any rights over the IDT cloud media that is associated with a specific IDT ID, and a recording operation 3336 in conjunction with a communication operation 39400 perform recording, by the smart contract, the immutable digital testimony ID and IDT hash on a public blockchain 1340.

In some embodiments, the method further performs granting, by the smart contract to a requestor, viewing permission to an immutable digital testimony corresponding to the IDT ID and registering the viewing permission on an IDT authentication blockchain 1330 and the IDT orchestrator 1210.

The method, in some embodiments, performs periodically validating and authenticating the immutable digital testimony authentication blockchain by using the immutable digital testimony hash recorded on the public blockchain.

"Alternate immutable digital testimony" as used herein generally means the alternate immutable digital testimony that was created using the immutable digital testimony local media to preserve the locally saved version when the smart contract determines that an immutable digital testimony was altered or modified.

"Alternate immutable digital testimony cloud address" as used herein generally means the immutable digital testimony cloud address of where the alternate immutable digital testimony was saved.

"Alternate immutable digital testimony DFS address" as used herein generally means the DFS address of where the alternate immutable digital testimony was saved.

In some embodiments, after being alerted by the smart contract of a potential alteration of an immutable digital testimony media, as shown by validation determining operation 3170, the device 1110 (i.e., on the witness layer 1100) executes a create alternate immutable digital testimony (IDT) operation 3180 to create an alternate immutable digital testimony (IDT) by performing a saving operation 3190 that saves the IDT local media to the DFS 1320, as shown by communication operation 39500, retrieving the corresponding alternate IDT DFS address, as shown by communication operation 39510. In addition, a saving operation performs saving the IDT local media to IDT cloud 1310, as shown by communication operation 39511 and retrieving operation perform retrieving the corresponding alternate IDT cloud address, as shown by communication operation 39512. In some embodiments, a notification operation 39050 performs providing a notification, by the smart contract, that the IDT stream media was corrupted during the transmission or storage process.

The alternate IDT is recorded on the DFS 1320 to ensure immutability. The alternate immutable digital testimony also is recorded on the IDT cloud 1310 for future playback.

In some embodiments, device 1110 performs an alternate immutable digital testimony sending operation 3191 that sends the immutable digital testimony metadata, live stream hash, local symbiotic hash, alternate immutable digital testimony cloud address, and alternate immutable digital testimony DFS address to the smart contract via communication operation 39060.

In some embodiments, a method performs a validation determining operation 3170 to determine if a) the live stream hash and the local symbiotic hash do not match or b) the live stream hash and a cloud media hash do not match. If so, a create alternate immutable digital testimony operation 3180 performs creating an alternate immutable digital testimony and a saving operation 3190 saves the IDT local media to the DFS via a communication operation 39500 and to the cloud server via a communication operation 39511 and retrieving the one or more alternate immutable digital testimony DFS addresses via communication operation 39510 and the one or more alternate immutable digital testimony cloud addresses via communication operation 39512, correspondingly.

In some embodiments, the method further involves an alternate immutable digital testimony sending operation 3191 to perform sending, by the device, the IDT metadata, the live stream hash, the local symbiotic hash, the one or more alternate IDT cloud addresses, and the one or more alternate IDT DFS addresses, to the smart contract via communication operation 39060.

In another embodiment a method involves several steps executed by a smart contract (e.g., on the IDT layer 1300). A communication operation 39060 performs receiving, by the smart contract, the alternate IDT metadata, the live stream hash, the local symbiotic hash, and the one or more IDT testimony DFS addresses.

A create creator token operation 3341 performs creating, by the smart contract, an alternate creator token by combining the IDT creator ID and the IDT device ID. In turn, a create immutable digital testimony alternate identifier operation 3342 performs creating, by the smart contract, an immutable digital testimony (IDT) alternate identifier (ID) by hashing the alternate creator token with the live stream hash and adding, for example, "ALT" at the end of the IDT alternate ID. An "immutable digital testimony (IDT) altered identifier (ID)" as used herein generally means a unique identifier assigned to an immutable digital testimony that was altered.

A form alternate immutable digital testimony (IDT) hash operation 3349 performs creating, by the smart contract, the alternate IDT hash by hashing the IDT alternate ID, the IDT metadata, the one or more alternate IDT cloud addresses, the one or more alternate IDT DFS addresses, the local symbiotic hash, and the live stream hash.

In turn, a record operation 3343 (also referred to as "an IDT authentication blockchain record operation") performs recording, by the smart contract, the IDT alternate ID, the IDT metadata, the one or more alternate IDT cloud addresses, the one or more alternate IDT DFS addresses, the live stream hash, the local symbiotic hash, and the IDT testimony hash to the IDT authentication blockchain 1330.

Another record operation 3344 performs recording, by the smart contract, user permissions corresponding to the IDT alternate ID on the IDT authentication blockchain 1330 and a communication operation 39600 performs sending the user permissions to an IDT orchestrator 1210 to update log entries of the IDT orchestrator 1210 (also referred to as "an IDT orchestrator record operation"). Another record operation 3345 performs recording, by the smart contract, the alternate immutable digital testimony ID and alternate IDT hash on the public blockchain 1340 in conjunction with communication operation 39700 (also referred to as "a public blockchain record operation").

In some embodiments, the IDT orchestrator 1210 (e.g., in orchestrator layer 1200) receives the user permissions via communication operation 39600 and, in turn, performs an update operation 3220 to update the IDT orchestrator's permission management system 3210 on the orchestrator layer 1200, creating a local ledger of permission details. IDT orchestrator 1210, in some embodiments, also performs a create operation 3230 to create an immutable digital testimony trail, described below in more detail.

Figure 6:
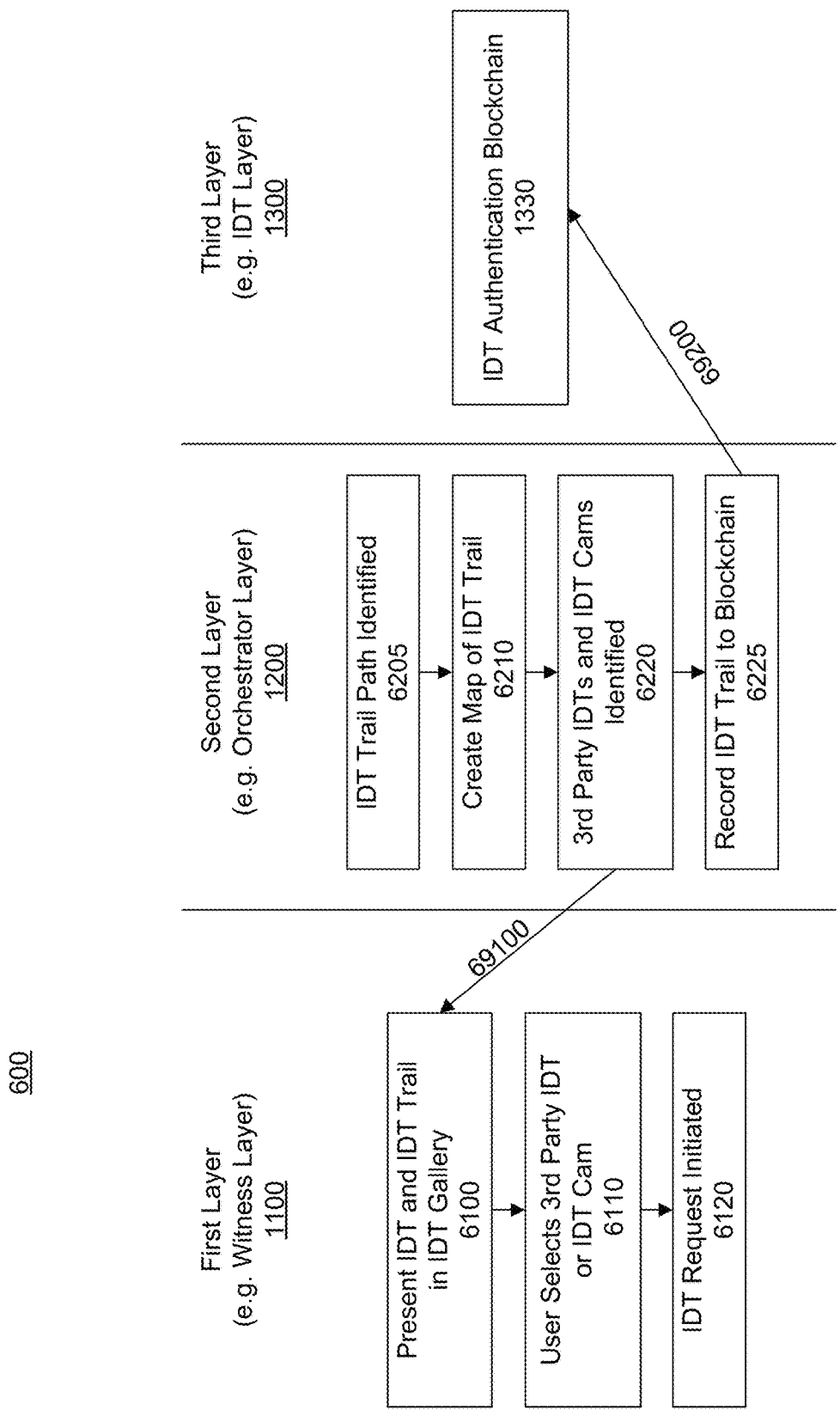
FIG. 6 illustrates a process for creating an immutable digital testimony trail, according to an example embodiment.
Figure 6:
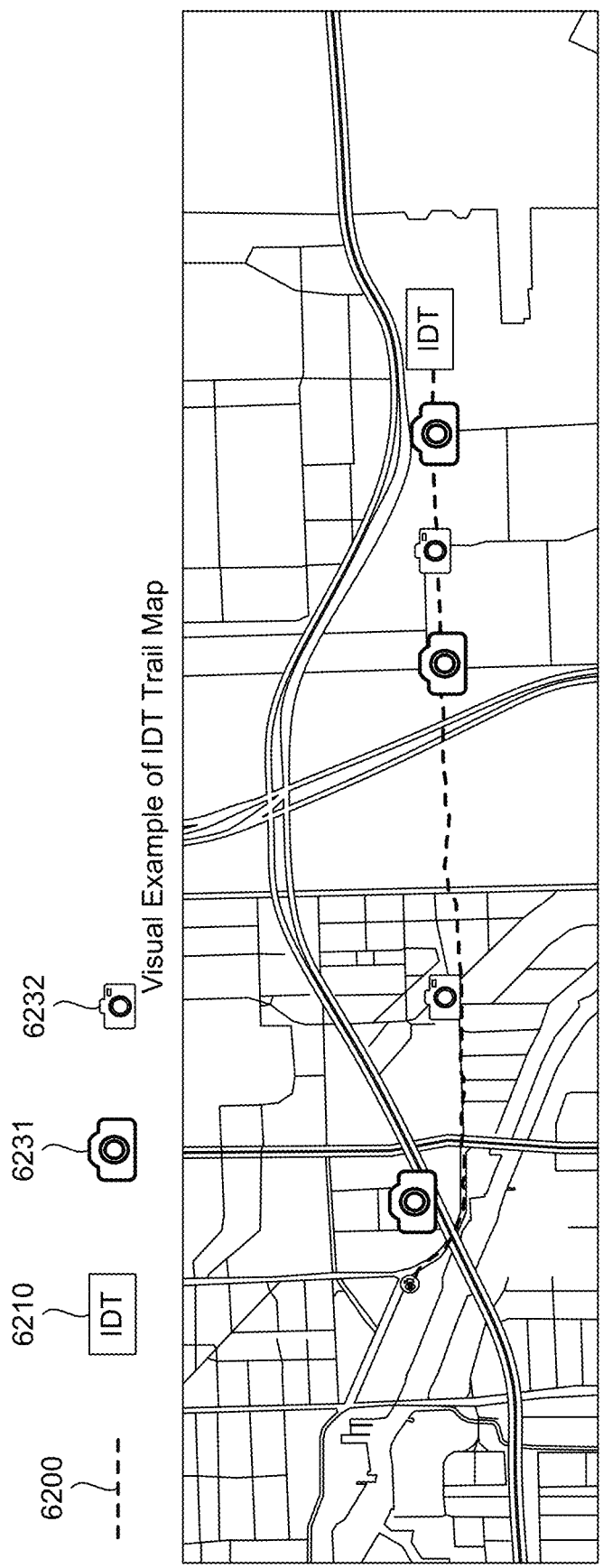

FIG. 6 illustrates a process 600 for creating an immutable digital testimony (IDT) trail 6200, according to an example embodiment. Generally, each immutable digital testimony can have an IDT trail associated with it. To the extent applicable, each immutable digital testimony can also have associated with it related third-party immutable digital testimonies. The IDT orchestrator 1210 operates to identify all third-party immutable digital testimonies (IDTs) and devices (e.g., mobile devices, cameras, etc.) along the path that a user took in the user-determined timeframe prior to the creation of the immutable digital testimony as illustrated by immutable digital testimony (IDT) path identification operation 6205 in FIG. 6. As explained below not all of the cameras have the ability to perform an IDT request process 2200 (FIG. 2).

The IDT orchestrator 1210, in some embodiments, gathers the information necessary to create a map of the IDT trail 6200 (e.g., using IDT geodata) as illustrated by create map of immutable digital testimony (IDT) trail operation 6210. In addition, IDT orchestrator 1210 identifies and visually indicates the location of all third-party immutable digital testimonies (IDTs) and immutable digital testimony (IDT) cameras, as shown by identification operation 6220. IDT orchestrator 1210, in some embodiments, also performs a communication operation 69100 to send the visualization indicating the location of all third-party IDTs and IDT cameras to the device 1110 requesting the IDT trail.

The IDT orchestrator 1210, in turn, performs a recording operation 6225 in conjunction with a communication operation 69200 to record on the IDT authentication blockchain 1330 the IDT ID, the IDT geodata related to the IDT trail, and all other immutable digital testimony identifiers identified or associated with other third-party IDTs and IDT cameras along the IDT trail.

In some embodiments, the IDT trail identifies other immutable digital testimonies (IDTs) created along a path. This method involves creating a map of the immutable digital testimony trail using IDT orchestrator 1210. Generally, IDT geodata is used to identify third-party IDTs and cameras along a user's path during a predetermined time (e.g., 60 minutes) before the creation of an immutable digital testimony. The method includes an identification operation 6220 that performs identifying and visually indicating the locations of these third-party IDTs and cameras. Subsequently, communication operation 69100 sends the map of the immutable digital testimony trail to the device. The IDT orchestrator performs a record operation 6225 in conjunction with communication operation 69200 to record the IDT ID, geodata, and the IDs of the identified third-party IDTs and cameras on the IDT authentication blockchain 1330.

Referring to FIG. 2, FIG. 3 and FIG. 6, in some embodiments, a thumbnail of the specific immutable digital testimony ID will appear in an immutable digital testimony (IDT) gallery for the testimony creator (e.g., on the witness layer 1100) and, as applicable, in an IDT gallery for the testimony requestor who initiated a third-party immutable digital testimony (IDT) request process 2210, as shown by presentation operation 3195. In turn, in the event available, the IDT trail will be associated to a specific immutable digital testimony ID and be accessible from an IDT gallery.

All third-party IDTs and devices (e.g., mobile devices, cameras, etc.) that allow for the requesting of an immutable digital testimony view will be identified visually (e.g., by a distinguishable device icon, for example, by the color or size of the icon), as shown by device 6231.

All third-party IDTs and cameras that do not provide the ability to request an immutable digital testimony view will be identified visually (e.g., by a distinguishable device icon, for example, by the color or size of the icon), as shown by device 6232. In turn, the user can initiate an IDT request view process 2220 such or testimony share process 2230, by selecting any of the devices (in this example cameras), as illustrated by third-party select operation 6110 of FIG. 6. Next, upon selecting a device (e.g., camera) on the IDT trail, an IDT request process 6120 is initiated to initiate the IDT request.

Another aspect provides a process for generating an IDT trail. The method involves creating an immutable digital testimony trail that identifies immutable digital testimony created along a path, involving: a IDT path identification operation 6205 that performs creating, by an IDT orchestrator 1210, a map of an immutable digital testimony trail by identifying (i) one or more third-party immutable digital testimonies, (ii) one or more cameras, or (iii) a combination of both (i) and (ii), each along a path taken by a user during a user-predetermined time prior to an immutable digital testimony creation. An identification operation 6220 performs identifying and visually indicating a location of (i) the one or more third-party immutable digital testimonies, (ii) the one or more cameras, or (iii) a combination of both (i) and (ii). A recording operation 6225 in conjunction with a communication operation 69200 perform recording on the IDT authentication blockchain 1330, by the IDT orchestrator 1210: the IDT trail associated with (i) an IDT ID and (ii) IDT geodata, each associated with the creator of the IDT local media, and one or more of an IDT IDs corresponding to (i) the one or more third-party immutable digital testimonies, (ii) the one or more cameras, or (iii) both (i) and (ii), correspondingly.

Referring to FIG. 3, in some embodiments, the method further involves a presentation operation 3195 that performs presenting a thumbnail corresponding to a specific IDT ID on an IDT gallery for the creator of the immutable digital testimony, and a presentation operation 6100 performs presenting the IDT trail as part of metadata of the IDT local media in the IDT gallery, wherein any one or a combination of (i) the one or more third-party immutable digital testimonies and (ii) the one or more cameras, each of which allow for the requesting of an immutable digital testimony view are identified with one or more icons, correspondingly 6231, 6232. An IDT request initiation operation 6120 performs initiating an IDT viewing process 2220 or IDT sharing request process 2230 for a corresponding immutable digital testimony.

Figure 4:
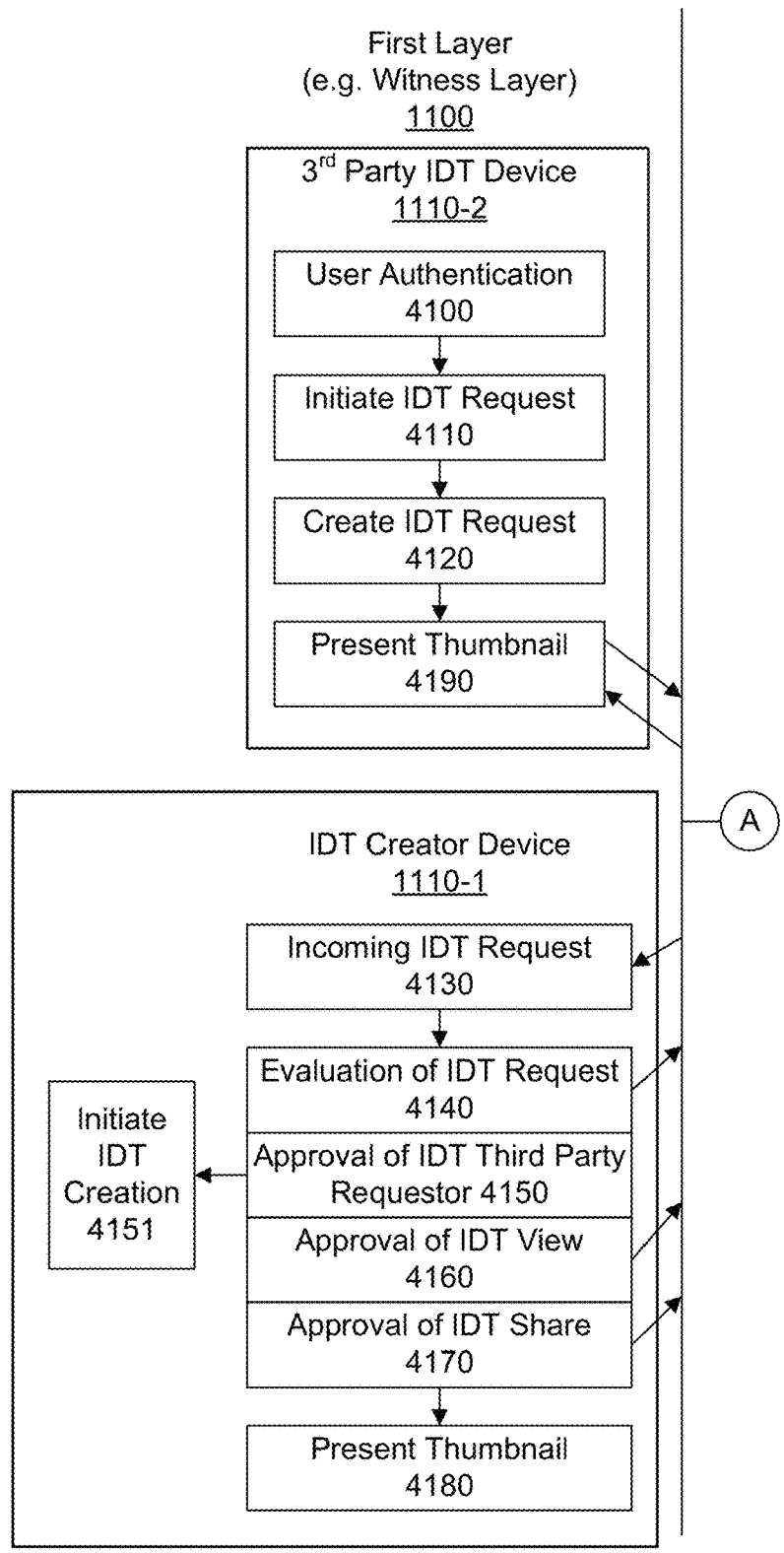
FIG. 4 illustrates a third-party request process for requesting an immutable digital testimony, according to an example embodiment.
Figure 4:
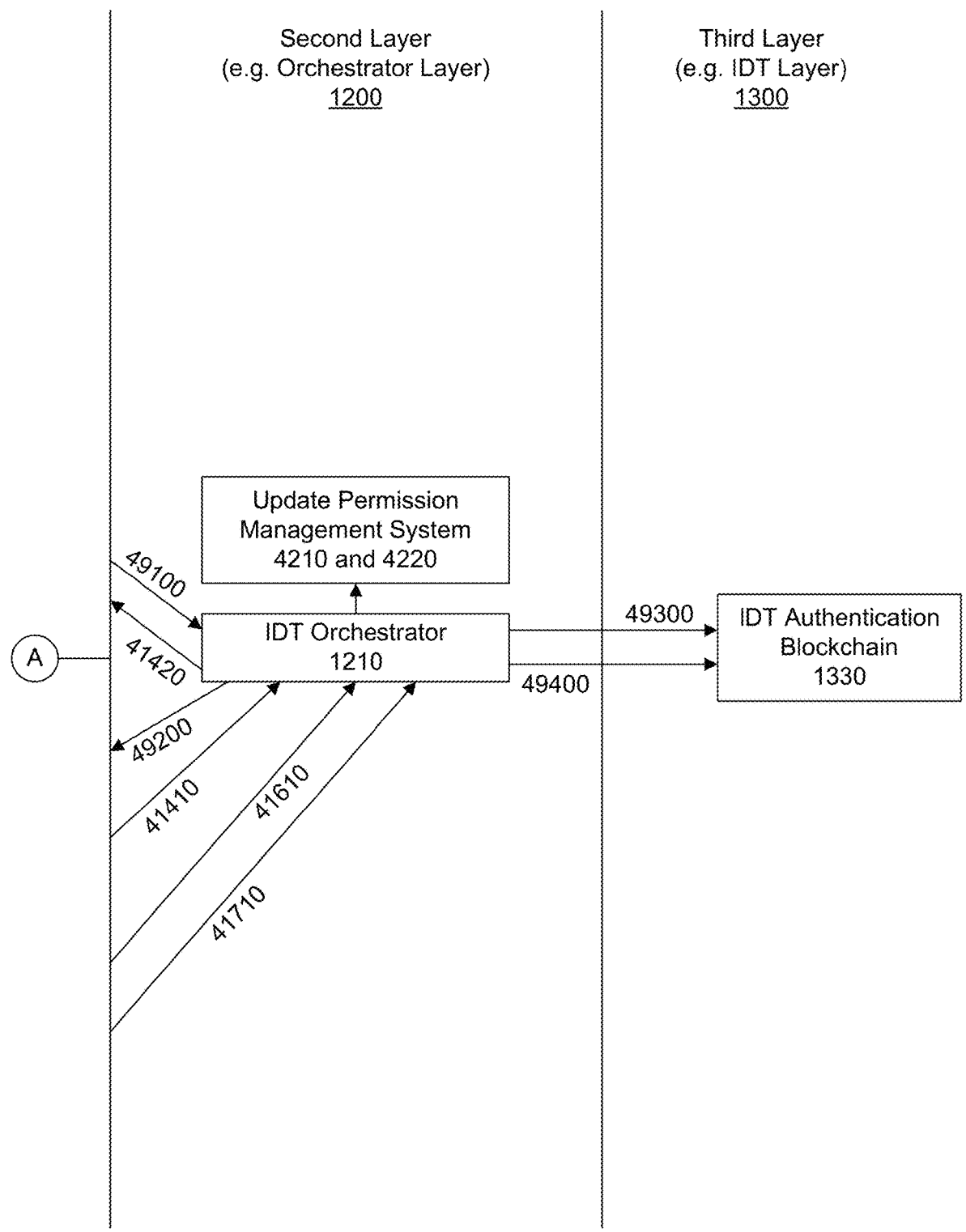

FIG. 4 illustrates a third-party request process 400 for requesting an immutable digital testimony, according to an example embodiment.

In some embodiments, a device (e.g., on the witness layer 1100) executes instructions causing the device to perform an identification and authentication of a third-party immutable digital testimony requestor who has requested an immutable digital testimony via a third-party immutable digital testimony device, as illustrated by user authentication operation 4100. In this example, the third-party IDT requestor is making the request via a device having installed therein IDT application 120, the third-party device being referred to as third-party IDT device 1110-2. The request for the immutable digital testimony causes an immutable digital testimony (IDT) request process to perform capturing the third-party immutable digital testimony requestor identifier ("third-party IDT ID") and the device identifier (ID) of the third-party IDT device 1110-2 used to create the request for the immutable digital testimony.

Referring also to FIG. 2, in turn, third-party immutable digital testimony requestor can initiate any one of a plurality of immutable digital testimony requests, as illustrated by initiate IDT request operation 4110. In some embodiments, the request is to initiate a third-party IDT request process 2210, requesting an IDT creator to initiate and share a new immutable digital testimony. In some embodiments, the request is to initiate an IDT viewing process 2220, requesting an IDT creator permission to view one or more existing immutable digital testimonies of the IDT creator. In some embodiments, the request is to initiate an IDT sharing request process 2230, requesting an IDT creator for permission to share one or more existing immutable digital testimonies of the IDT creator with another user or device on the network 100.

In some embodiments, the third-party IDT device 1110-2, creates the IDT request by combining the third-party IDT ID, the phone number of the IDT creator, and an IDT ID (e.g., in the case of an IDT viewing process 2220 and IDT sharing request process 2230), as illustrated by create immutable digital testimony request operation 4120.

In turn, the third-party IDT device 1110-2 sends the IDT request to the IDT orchestrator as illustrated by communication operation 49100.

In an example embodiment, a method for requesting an immutable digital testimony is provided. The method involves identifying the user of a device, such as a third-party IDT device 1110-2, to authenticate a third-party immutable digital testimony (IDT) requestor, by capturing a third-party immutable digital testimony requestor's immutable digital testimony creator ID, and a third-party immutable digital testimony requestor's immutable digital testimony device ID of the third-party device used to create the immutable digital testimony request, as illustrated by user authentication operation 4100. The method further involves initiating, by the third-party immutable digital testimony requestor from an immutable digital testimony creator, any one or more of: an immutable digital testimony request requesting to initiate and share a new immutable digital testimony, an immutable digital testimony view request requesting permission to view an immutable digital testimony creator's existing immutable digital testimony, an immutable digital testimony share request requesting permission to share one of immutable digital testimony creator's existing immutable digital testimonies with another immutable digital testimony network user, as illustrated by initiate IDT request operation 4110. The method further involves creating, by the device (e.g., the third-party IDT device 1110-2 in FIG. 4), the immutable digital testimony request by combining any one or a combination of: the third-party immutable digital testimony requestor's ID, the immutable digital testimony creator's phone number, and immutable digital testimony ID as illustrated by create immutable digital testimony request operation 4120. In turn, the method performs sending, by the third-party IDT device 1110-2, the immutable digital testimony request to an immutable digital testimony orchestrator as illustrated by communication operation 49100.

In some embodiments, authenticating the third-party IDT requestor includes capturing a third-party IDT requestor ID, and a third-party IDT requestor device ID corresponding to a device of the third-party IDT requestor used to create the immutable digital testimony request, as illustrated by user authentication operation 4100.

In some use cases, the IDT orchestrator 1210 (e.g., on orchestrator layer 1200) directs the third-party IDT request to a user that is not an IDT creator. If the user is not a member of the network 100, then the IDT orchestrator 1210 prompts the user (referred to as "an unregistered IDT creator") to download the IDT application 120 and register to create one or more IDTs, as shown by communication operation 49200.

In some embodiments the device of the IDT creator or intended IDT creator performs an incoming IDT request operation 4130 to present an alert for the IDT creator (or intended IDT creator) of an incoming immutable digital testimony (IDT) request. Here the device is referred to as IDT creator device 1110-1 or simply creator device 1110-1, which also has installed thereon IDT application 120.

In turn, the IDT creator (or intended IDT creator) evaluates whether to grant the IDT request as illustrate by evaluation of IDT request operation 4140.

If the IDT creator (or intended IDT creator) declines the IDT request, then the device notifies the denial as illustrated by communication operation 41410 to the IDT orchestrator 1210, which in turn notifies the requestor, as illustrated by communication operation 41420.

If the IDT creator (or intended IDT creator) approves the request for an IDT as illustrated by approval of the third-party IDT request operation 4150, then the IDT creator initiates the IDT creation process as illustrated by initiated IDT creation operation 4151.

If the third-party request is a request for approval to view an IDT and the IDT creator approves the request, as illustrated by approval of IDT view operation 4160, then the creator device 1110-1 notifies the IDT orchestrator 1210 of the approval as illustrated via communication operation 41610 and the IDT orchestrator 1210 updates the permission management system 3210 on the orchestrator layer 1200 as illustrated by update operation 4210, granting the third-party requestor, based on the third-party requestor ID, viewing rights over the specific IDT ID that was included in the IDT view request.

In turn, the creator device 1110-1 records the view permission as illustrated by communication to the IDT authentication blockchain 1330 on the IDT layer 1300, creating a log entry indicating that the third-party requestor ID has viewing rights over the specific IDT ID that was included in the IDT view request as illustrated by communication operation 49300.

In the event the IDT creator approves a request to share an immutable digital testimony (e.g., IDT sharing request 2300), as illustrated by operation 4170, then the creator device 1110-1 notifies the IDT orchestrator 1210 of the approval as illustrated by communication operation 41710 and IDT orchestrator 1210 performs an update operation 4220 to update the permission management system 3210 on the orchestrator layer 1200, granting the third-party requestor, via the third-party requestor ID associated with the third-party request, sharing rights over the specific IDT ID that was included in the IDT share request.

In turn, the creator device 1110-1 records the share permission to the IDT authentication blockchain 1330 on the IDT layer 1300, creating a log entry indicating that the third-party requestor associated with the third-party requestor ID has sharing rights over the specific IDT ID that was included in the IDT share request as illustrated by communication operation 49400.

In some embodiments, a thumbnail of the specific IDT ID (that was included in the IDT request) is presented via an immutable digital testimony (IDT) gallery for the IDT creator (e.g., on witness layer 1100) as illustrated by presentation operation 4180 and present operation 4190 presents the thumbnail in the IDT gallery for the third-party requestor who initiated the IDT request. In an example implementation, the thumbnail will have a badge of a first color (e.g., green) if viewing permission was granted and a badge of another color (e.g., yellow) if sharing permission was granted. Other indication techniques can be used instead and still be within the scope of the embodiments herein.

Figure 5:
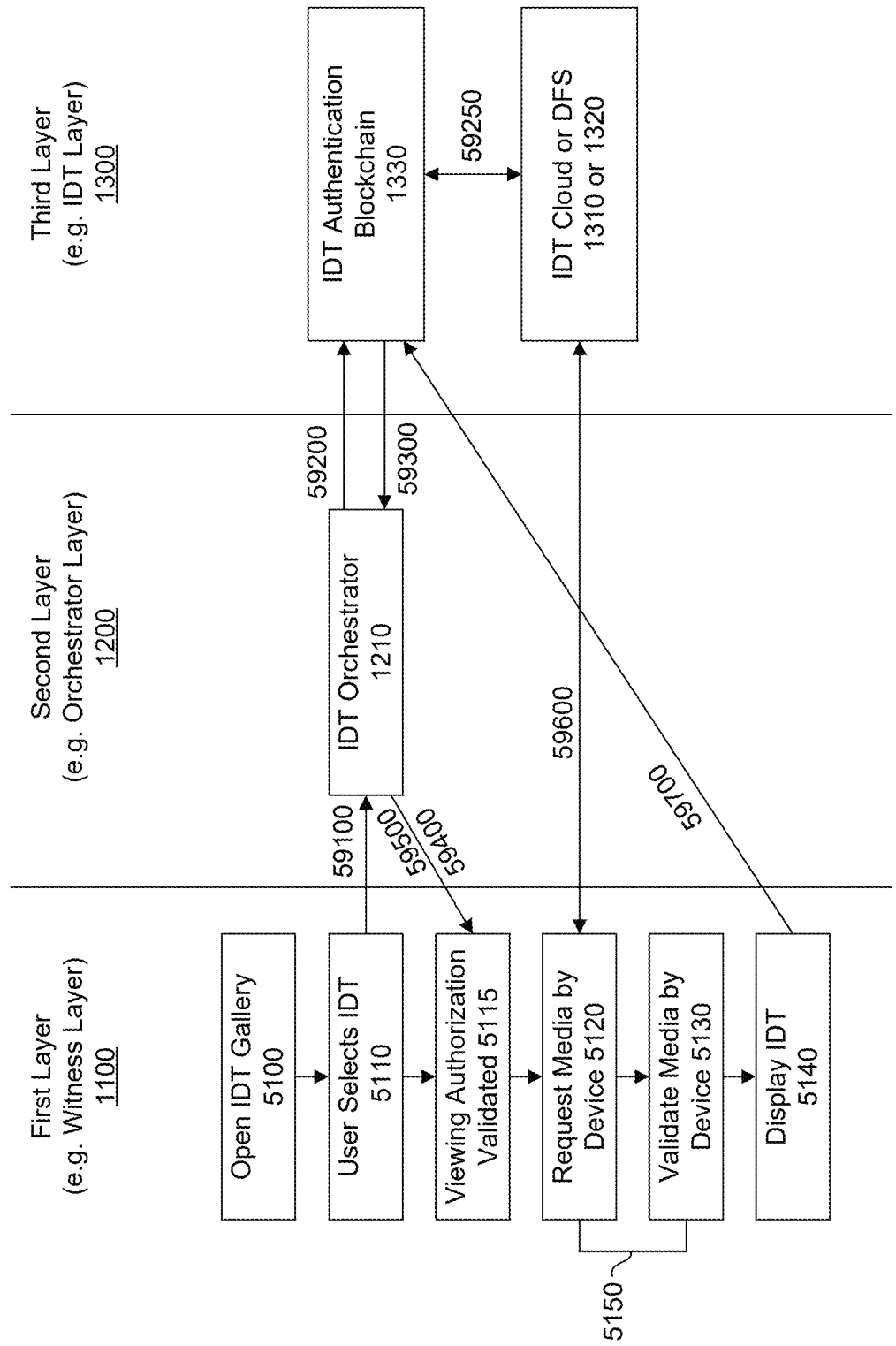
FIG. 5 illustrates an immutable digital viewing process, according to an example embodiment.

FIG. 5. illustrates an immutable digital viewing process 500, according to an example embodiment.

In an example implementation, a user opens, via a device (e.g., on witness layer 1100) such as creator device 1110-1 or third-party IDT device 1110-2, an IDT gallery feature as illustrated by open IDT gallery operation 5100. To view an IDT, the user selects the specific thumbnail. The device receives a selection of a specific thumbnail as illustrated by user IDT selection operation 5110.

In turn, the device sends the request to view an immutable digital testimony (for a specific IDT ID) to the IDT orchestrator 1210 (on orchestrator layer 1200), as illustrated by communication operation 59100.

The IDT orchestrator 1210 receives the request to view the IDT and verifies on the IDT authentication blockchain 1330 that the user associated with the request for the IDT view has view permission as illustrated by communication, as illustrated by communication operation 59200. If the user associated with the request has viewing permission, the smart contract on the IDT authentication blockchain 1330 retrieves the IDT frame hashing scheme from the IDT metadata recorded on the IDT authentication blockchain 1330 as illustrated by communication operation 59250. If the user has viewing permission, the smart contract on the IDT authentication blockchain 1330 notifies the IDT orchestrator 1210 and sends the IDT cloud address, the live stream hash, and IDT frame hashing scheme, to the device via IDT orchestrator 1210, as illustrated by communication operation 59300 and communication operation 59400, respectively.

If the IDT authentication blockchain 1330 also has an alternate immutable digital testimony, then the IDT orchestrator 1210 will also send to the device the corresponding information for both the corresponding IDT ID and the immutable digital testimony alternate ID.

If the user is not authorized to view the immutable digital testimony, then the IDT authentication blockchain 1330 notifies, via communication operation 59300, IDT orchestrator 1210. In turn, IDT orchestrator notifies the IDT application 120 on the device that there is no viewing permission via communication operation 59500 and issues an inquiry as to whether the user wants to send a request to view an immutable digital testimony (e.g., by initiating an IDT viewing process 2220).

A viewing authorization operation 5115, in turn, performs a viewing authorization validation. The device (e.g., on the witness layer 1100) then performs a request media operation 5120 to request the IDT cloud media from the IDT cloud 1310.

IDT cloud 1310, in turn, transmits (e.g., streams or downloads) the IDT cloud media directly from the IDT cloud address on the IDT cloud 1310, as illustrated by communication operation 59600.

As the media is transmitted, a media validation operation 5130 performs validating the incoming IDT cloud media by creating a viewing hash. A "viewing hash" as used herein generally means a hash of media that is played back live to a viewer to validate that the original media has not been corrupted during transmission nor been altered since the date of its corresponding immutable digital testimony creation. In an example implementation, a viewing has is created by hashing each frame of the streamed IDT cloud media (using the IDT frame hashing scheme, e.g., from communication operation 59400 which are then combined or hashed together to form the viewing hash. Once the viewing hash is completed it is compared with the live stream hash.

In some embodiments, if the viewing hash matches the live stream hash, then an IDT display operation 5140 performs presenting the IDT media on the IDT viewer and the device records the viewing event on the IDT authentication blockchain 1330 including the IDT ID the IDT user ID, the IDT device ID, and date of viewing via communication operation 59700.

In some embodiments, if there is an alternate IDT then the media corresponding to the alternate IDT will also be transmitted from the alternate IDT DFS address and the viewing hash is created by applying the hashing procedure to the alternate IDT media and comparing it to the local symbiotic hash (which would be downloaded in place of the live stream hash).

If the viewing hash does not match the live stream hash, then the user is alerted, via the device, that the streaming IDT cloud media has been altered or the streaming IDT cloud media was corrupted during the download, requiring reinitiating the transmission as illustrated by reinitiating operation 5150.

The IDT DFS Address (and the corresponding media) can potentially be used to recreate or reconstruct an IDT in case the IDT Cloud Media is corrupted or altered.

Figure 7:
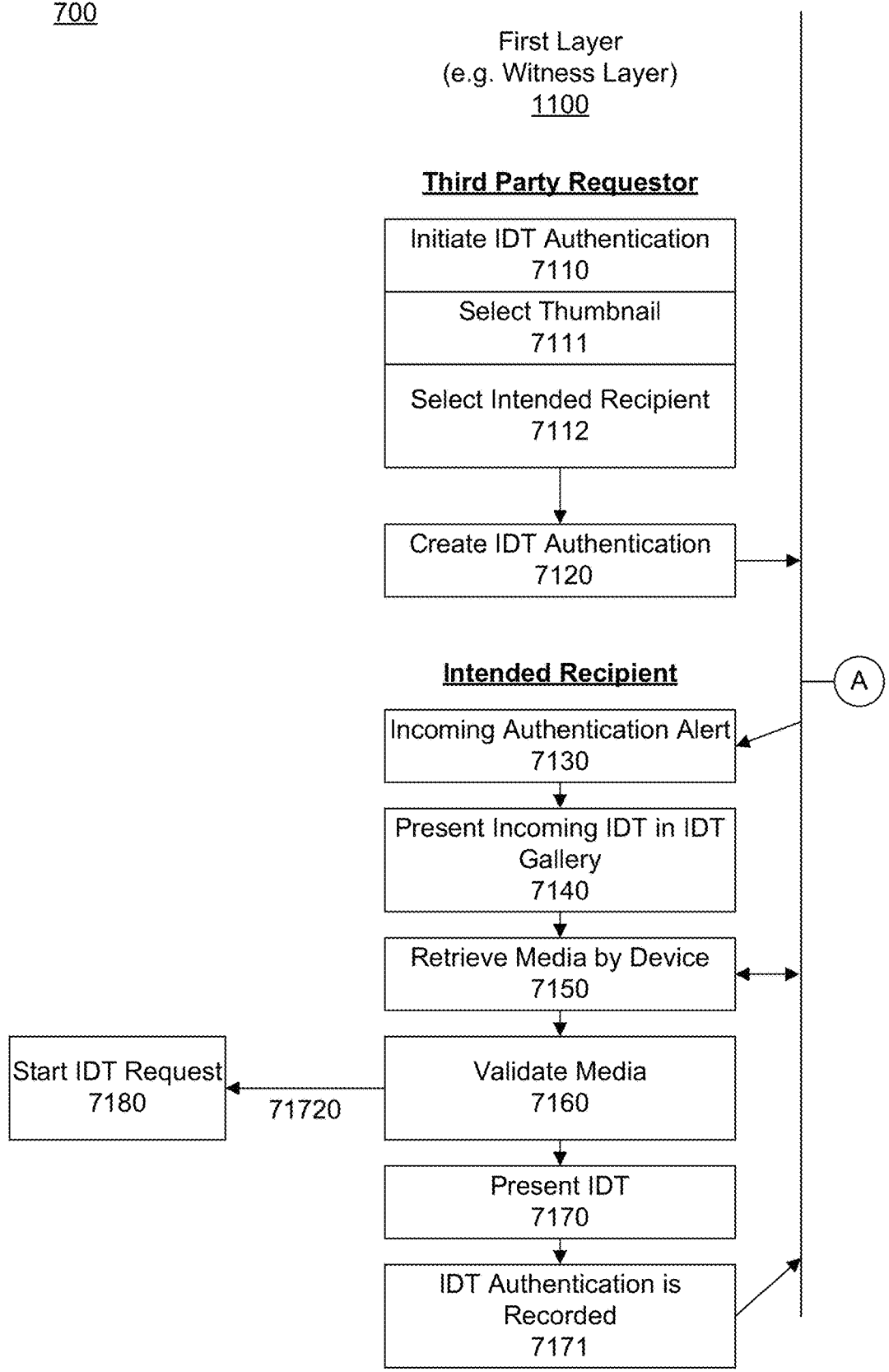
FIG. 7 illustrates an immutable digital testimony authentication process, according to an example embodiment.
Figure 7:
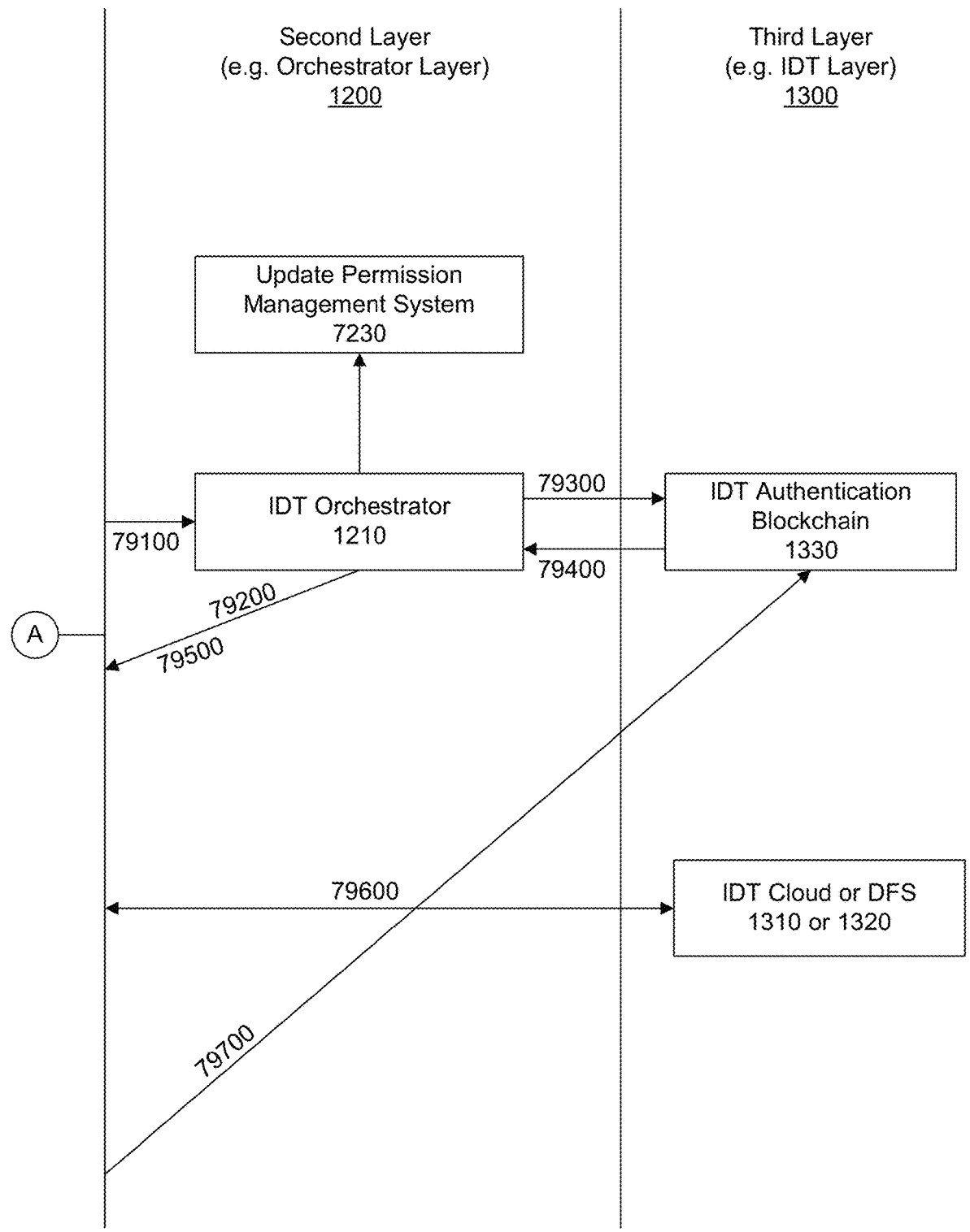

FIG. 7 illustrates an immutable digital testimony (IDT) authentication process 700, according to an example embodiment. Generally, IDT authentication process 700 enables a user on the network 100 to request that an immutable digital testimony be sent and authenticated for the benefit of a specific user.

The method involves an initiation operation 7110 that performs receiving an initiation request (e.g., via a user input device 106 of device 1110), the initiation request requesting that the immutable digital testimony of the user issuing the request, such as the IDT creator, be sent and authenticated for the benefit of a specific user. In turn, the user selects the thumbnail from their photo gallery and select the authenticate button as illustrated by select operation 7111.

A recipient selection operation 7112 receives (e.g., via user input device 106 of device 1110) a selection of a person or persons (e.g., from a contacts list on the device) to whom the user wants to send the immutable digital testimony authentication. The recipient is referred to as an "intended recipient."

A create immutable digital testimony operation 7120 performs creating, by the device, the IDT authentication and sending, in an example implementation, the intended recipient's phone number and IDT ID to the IDT orchestrator 1210 as illustrated by communication operation 79100.

Upon receipt of the intended recipient's phone number and IDT ID, IDT orchestrator 1210 proceeds to execute the Immutable digital testimony authentication. In an example implementation, if the intended recipient is not a member of the network 100 (e.g., the intended recipient has not registered for access to the network 100), then the IDT orchestrator 1210 will prompt the intended recipient to download and execute on their device the IDT application 120, as illustrated by communication operation 79200.

IDT orchestrator 1210, in turn, performs a recording operation to record the IDT authentication on the IDT authentication blockchain 1330, as illustrated by communication operation 79300. Recording operation further creates a log entry indicating that the intended recipient's IDT user ID has viewing rights over a specific IDT ID that was shared.

The IDT orchestrator 1210, in turn, retrieves from the IDT authentication blockchain 1330, the IDT cloud address, the live stream hash, and the IDT frame hashing scheme, as illustrated by communication operation 79400.

If the IDT authentication blockchain 1330 also has an alternative immutable digital testimony, then the IDT orchestrator 1210 will also send to the intended recipient the corresponding information for both the IDT ID and the IDT alternate ID.

IDT orchestrator 1210, in some embodiments, further performs an update operation 7230 to update the permission management system on the orchestrator layer 1200, granting the intended Recipient's Immutable digital testimony User ID viewing rights over the specific IDT ID that was included in the IDT authentication.

The IDT orchestrator 1210 further sends, via communication operation 79500, the IDT ID, IDT cloud address, the live stream hash, and the IDT frame hashing scheme to the device of the intended recipient.

In turn, the device of the intended recipient alerts the intended recipient of an incoming IDT authentication, as illustrated by incoming authentication alert operation 7130. A presentation operation 7140 performs presenting a thumbnail of the specific IDT ID (e.g., that was included in the IDT authentication), causing the thumbnail to appear on the IDT gallery of the intended recipient.

The IDT application 120, in turn, will (e.g., automatically) perform a request operation 7150 to request the IDT cloud media from the IDT cloud and the media will be transmitted (e.g., streamed or downloaded), as illustrated by communication operation 79600.

As the media is being transmitted (e.g., streamed or downloaded), the incoming IDT cloud media is validated by a validation operation 7160, by forming a validation hash. A "validation hash" as used herein generally means a hash of media that is played back live to a viewer to validate that the original media has not been altered since the date of its corresponding immutable digital testimony creation.

The validation hash is formed, in an example implementation, by hashing of each frame of the live streamed IDT cloud media (using the IDT frame hashing scheme received via communication operation 79500) which are then combined or hashed together to form the validation hash. Once the validation hash is completed it is compared to the live stream hash.

If the validation hash matches the live stream hash, then a presentation operation 7170 performs displaying the immutable digital testimony on an IDT viewer and the device performs a recording operation 7171 in conjunction with communication operation 79700 to record the viewing event on the IDT authentication blockchain 1330 including the IDT ID, the IDT user ID, the IDT device ID, and date of viewing.

If an alternative immutable digital testimony exists, then the media corresponding to the alternative immutable digital testimony will also be transmitted (e.g., streamed or downloaded) from the alternate IDT cloud address and the validation hash is created by applying the hashing procedure to the alternate IDT media and comparing it to the local symbiotic hash (which, in an example implementation, would be downloaded in place of the live stream hash).

If the validation hash does not match the live stream hash, then the IDT application 120 alerts the intended recipient that the IDT cloud media has been altered or the IDT cloud media was corrupted during the transmission as illustrated by communication operation 71720, requiring reinitiating the transmission (e.g., streaming or download), as illustrated by start operation 7180.

The IDT DFS address (and the corresponding media) can, in some embodiments, also be used to recreate or reconstruct an immutable digital testimony in case the IDT cloud media is corrupted or altered.

In some embodiments, a non-transitory computer-readable medium having stored thereon one or more sequences of instructions for causing one or more processors to perform any of the methods described herein.

The following are additional clauses relative to the present disclosure, which could be combined and/or otherwise integrated with any of the embodiments described above or listed in the claims below.

Clause 1. A method for processing a request for immutable digital testimony media, comprising:
  transmitting immutable digital testimony cloud media from one or more cloud addresses on a cloud (59600);
  as the immutable digital testimony cloud media is being transmitted, validating the immutable digital testimony cloud media (5130) by:
    selecting one or more frames of the immutable digital testimony cloud media that is being transmitted,
    hashing one or more frames of the selected one or more frames of the transmitting immutable digital testimony cloud media using a selected immutable digital testimony hashing scheme, thereby creating one or more immutable digital testimony transmitting hashes, and
    combining the one or more immutable digital testimony transmitting hashes, thereby forming a viewing hash; and
  comparing the viewing hash with a live stream hash, wherein:
    (a) if the viewing hash matches the live stream hash: playing the immutable digital testimony cloud media on an immutable digital testimony viewer (5140) and recording, by the device, a viewing event on an immutable digital testimony authentication blockchain including an immutable digital testimony ID, third-party requester immutable digital testimony ID, a third-party requester immutable digital testimony device ID, and a date of viewing (59700), and (b) if the viewing hash does not match the live stream hash: generating an alert indicating that the immutable digital testimony cloud media has been altered or the immutable digital testimony cloud media was corrupted during the transmitting, thereby requiring reinitiating a download of the immutable digital testimony cloud media (5150).

Clause 2. The method according to clause 1, wherein the live stream hash (3130) was created by:

hashing one or more frames of the immutable digital testimony stream media for the one or more cameras by applying a selected immutable digital testimony hashing scheme from a plurality of hashing schemes, thereby creating one or more immutable digital testimony stream hashes (3130, 3132); and forming the live stream hash (3133) from the one or more immutable digital testimony stream hashes.

Clause 3. The method according to claim clause 1, further comprising:

transmitting (59600) immutable digital testimony cloud media of an alternate immutable digital testimony from one or more immutable digital testimony cloud addresses or one or more immutable digital testimony DFS addresses; and displaying the immutable digital testimony cloud media corresponding to the alternate immutable digital testimony.

Clause 4. A method for validating media stored on a cloud server, comprising:

selecting one or more frames of a live stream and hashing one or more frames of the selected one or more frames of the live stream using a selected hashing scheme, thereby creating one or more live stream hashes;

combining the one or more live stream hashes, thereby forming a combined live stream media hash;

sending the combined live stream media hash to a smart contract;

selecting one or more frames of media stored on a first storage device, and hashing one or more frames of the selected frames of the media stored on the first storage device using the selected immutable digital testimony hashing scheme, thereby creating one or more first storage device media hashes, and combining the one or more first storage device media hashes, thereby forming a combined first storage device media hash;

selecting one or more frames of media stored on a second storage device, and hashing one or more frames of the selected frames of the media stored on the second storage device using the selected immutable digital testimony hashing scheme, thereby creating one or more second storage device media hashes, and combining the one or more second storage device media hashes, thereby forming a combined second storage device media hash;

comparing, by the smart contract: the combined live stream media hash, the combined first storage device media hash, and the combined second storage device media hash;

if a) the combined live stream media hash mirrors the combined first storage device media hash and b) the combined live stream media hash mirrors the combined second storage device media hash:

providing a notification, by the smart contract, that the live stream media, the media stored on the first storage device and the media stored on the second storage device has been validated; and if a) the combined live stream media hash and the combined first storage device media hash do not match or b) the combined live stream media hash and the combined second storage device media hash do not match:

providing a notification, by the smart contract, that one or a combination of (i) the live stream media, (ii) the media stored on the first storage device, and (iii) the media stored on the second storage device, has been corrupted.

Clause 5. A system having one or more processors communicatively coupled to a plurality of sensors, and a non-transitory memory, the non-transitory memory storing instructions that when executed by the processor, control the system to perform the methods of Clauses 1-4.

Clause 6. A non-transitory computer-readable medium having stored thereon one or more sequences of instructions for causing one or more processors to perform the methods of Clauses 1-4.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-7 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for creating an immutable digital testimony, comprising the steps of:

activating an immutable digital testimony creation operation on a device (1110) having an immutable digital testimony device identifier (ID), wherein the immutable digital testimony device ID is a unique identifier of the device (2102);

authenticating a creator of an immutable digital testimony based on an immutable digital testimony creator ID, wherein the immutable digital testimony creator ID is a unique user identification created upon registering with an immutable digital testimony network (3100);

capturing the immutable digital testimony device ID of the device used to create the immutable digital testimony (3100); and upon authentication of the creator, initiating by the device, an immutable digital testimony capture operation (3110) including:
  activating one or more cameras associated with the device and causing the device to generate immutable digital testimony stream media (3120),
  hashing one or more frames of the immutable digital testimony stream media for the one or more cameras by applying a selected immutable digital testimony hashing scheme from a plurality of hashing schemes, thereby creating one or more immutable digital testimony stream hashes (3130, 3132),
  forming a live stream hash (3130, 3133) from the one or more immutable digital testimony stream hashes,
  capturing immutable digital testimony metadata (3140) to be recorded on an immutable digital testimony authentication blockchain,
  transmitting the immutable digital testimony stream media and the selected immutable digital testimony hashing scheme by the device to a cloud server (3147, 39100), causing the selected immutable digital testimony hashing scheme and the immutable digital testimony stream media to be stored on the cloud server as immutable digital testimony cloud media,
  retrieving one or more immutable digital testimony addresses (39110), each of the one or more immutable digital testimony addresses being (i) one or more cloud addresses on the cloud server, (ii) one or more distributed file system addresses (DFS addresses) on a distributed file system (DFS), or (iii) a combination of (i) and (ii), correspondingly, wherein each of the one or more immutable digital testimony addresses corresponds to (i) a location at which the immutable digital testimony cloud media is saved, the immutable digital testimony cloud media being at least a portion of the immutable digital testimony stream media, or (ii) a location allocated for saving the immutable digital testimony cloud media which is at least a portion of the immutable digital testimony stream media,
  upon completion of the transmitting:
    encrypting the immutable digital testimony live stream media (3148) thereby creating encrypted immutable digital testimony live stream media, the encrypted immutable digital testimony live stream media being at least a portion of the immutable digital testimony stream media,
    sending to the DFS the encrypted immutable digital testimony live stream media (39100) to save the encrypted immutable digital testimony live stream media,
    receiving (39015) one or more immutable digital testimony DFS addresses, wherein each of the one or more immutable digital testimony DFS addresses corresponds to a location at which the encrypted immutable digital testimony live stream media has been saved, and
  saving the immutable digital testimony stream media on the device to create immutable digital testimony local media (3149).

2. The method of claim 1, further comprising:
selecting one or more frames of the immutable digital testimony local media corresponding to the same one or more frames of the immutable digital testimony stream media (3151);
hashing one or more frames of the selected one or more frames of the immutable digital testimony local media using the selected immutable digital testimony hashing scheme, thereby creating one or more immutable digital testimony local hashes (3152);
forming a local symbiotic hash (3150, 3153) from the one or more immutable digital testimony local hashes;
sending (39020), by the device to a smart contract, the local symbiotic hash for validating against the live stream hash; and
sending (3160, 39030), by the device to the smart contract, the live stream hash, the immutable digital testimony metadata, the one or more immutable digital testimony DFS addresses, and the one or more immutable digital testimony cloud addresses.

3. The method according to claim 2, further comprising:
selecting one or more frames of the immutable digital testimony cloud media corresponding to the same one or more frames of the immutable digital testimony stream media (3311);
hashing one or more frames of the selected one or more frames of the immutable digital testimony cloud media using the selected immutable digital testimony hashing scheme, thereby creating one or more immutable digital testimony cloud hashes (3312);
forming a cloud media hash (3313) from the one or more immutable digital testimony cloud hashes; and
sending (39040), by the cloud server to the smart contract, the cloud media hash for validating against the live stream hash.

4. The method according to claim 3, further comprising:
creating, by the smart contract, a creator token by combining the immutable digital testimony creator ID and the immutable digital testimony device ID (3331);
creating, by the smart contract, an immutable digital testimony identifier (ID) (3332) by hashing the creator token with the live stream hash; and
comparing, by the smart contract, the live stream hash, the local symbiotic hash, and the cloud media hash, and if a) the live stream hash mirrors the local symbiotic hash and b) the live stream hash mirrors the cloud media hash (3333):
  creating, by the smart contract, an immutable digital testimony hash by hashing the immutable digital testimony ID, the one or more immutable digital testimony cloud addresses, the immutable digital testimony metadata, the one or more immutable digital testimony DFS addresses, and the live stream hash (3380),
  recording, by the smart contract: the immutable digital testimony ID, the one or more immutable digital testimony cloud addresses, the immutable digital testimony metadata, the one or more immutable digital testimony DFS addresses, the immutable digital testimony hash, the live stream hash on the immutable digital testimony authentication blockchain (3334), and user permissions on an immutable digital testimony authentication blockchain (3335),
  sending the user permissions to an immutable digital testimony orchestrator (1210) to create, based on the user permissions, a log entry indicating whether a corresponding immutable digital testimony creator ID has any rights over the immutable digital testimony cloud media that is associated with a specific immutable digital testimony ID (39300), and recording, by the smart contract, the immutable digital testimony ID and immutable digital testimony hash on a public blockchain (39400) (33360).

5. The method according to claim 4, further comprising:
granting, by the smart contract to a requestor, viewing permission to an immutable digital testimony corresponding to the immutable digital testimony ID and registering the viewing permission on an immutable digital testimony authentication blockchain and the immutable digital testimony orchestrator (1210) (3335).

6. The method according to claim 4, further comprising:
periodically validating and authenticating the immutable digital testimony authentication blockchain, using the immutable digital testimony hash recorded on the public blockchain.

7. The method according to claim 3, further comprising:
if a) the live stream hash and the local symbiotic hash do not match or b) the live stream hash and a cloud media hash do not match:
creating an alternate immutable digital testimony (3180) by saving (3190) the immutable digital testimony local media to a distributed file system (DFS) (39500) and the cloud server (39511) and retrieving the one or more alternate immutable digital testimony DFS addresses (39510) and the one or more alternate immutable digital testimony cloud addresses (39512), correspondingly, and
providing a notification, by the smart contract, that the immutable digital testimony stream media was corrupted during the transmission or storage process (39050).

8. The method according to claim 7, further comprising:
sending (3191, 39060), by the device, the immutable digital testimony metadata, the live stream hash, the local symbiotic hash, the one or more alternate immutable digital testimony cloud addresses, and the one or more alternate immutable digital testimony DFS addresses, to the smart contract.

9. The method according to claim 7, further comprising:
receiving, by the smart contract, the alternate immutable digital testimony metadata, the live stream hash, the local symbiotic hash, and the one or more alternate immutable digital testimony DFS addresses (39060);
creating, by the smart contract, an alternate creator token by combining the immutable digital testimony creator ID and the immutable digital testimony device ID (33410);
creating, by the smart contract, an immutable digital testimony alternate identifier (ID) (33420) by hashing the alternate creator token with the live stream hash and adding ALT at the end of the immutable digital testimony alternate ID;
creating, by the smart contract, the alternate immutable digital testimony hash by hashing the immutable digital testimony alternate ID, the immutable digital testimony metadata, the one or more alternate immutable digital testimony cloud addresses, the one or more alternate immutable digital testimony DFS addresses, the local symbiotic hash, and the live stream hash (3349);
recording, by the smart contract, the immutable digital testimony alternate ID, the immutable digital testimony metadata, the one or more alternate immutable digital testimony cloud addresses, the one or more alternate immutable digital testimony DFS addresses, the live stream hash, the local symbiotic hash, and the alternate immutable digital testimony hash to the immutable digital testimony authentication blockchain (33430);
recording, by the smart contract, user permissions corresponding to the immutable digital testimony alternate ID on the authentication blockchain (33440) and sending the user permissions (39600) to an immutable digital testimony orchestrator (1210) to update log entries of the immutable digital testimony orchestrator (1210); and
recording, by the smart contract, the alternate immutable digital testimony ID and alternate immutable digital testimony hash on the public blockchain (33450, 39700).

10. The method according to claim 7, further comprising:
receiving, by the immutable digital testimony orchestrator (1210), user viewing permissions to an immutable digital testimony corresponding to the immutable digital testimony alternate ID (39600); and
creating, by the immutable digital testimony orchestrator (1210), a local ledger of permission details based on the user permissions.

11. The method of claim 1, further comprising:
authenticating a third-party immutable digital testimony requestor;
initiating, by the third-party immutable digital testimony requestor from an immutable digital testimony creator, a third-party request, the third-party request being any one or more of (4110):
an immutable digital testimony request, requesting to create and share a new immutable digital testimony (2210),
an immutable digital testimony view request, requesting permission to view an existing immutable digital testimony of the creator (2220), or
an immutable digital testimony share request, requesting permission to share an existing immutable digital testimony of the creator with another immutable digital testimony network user (2230);
creating, by the device of the third-party immutable digital testimony requestor, the third-party request by combining any one or a combination of: the third-party immutable digital testimony requestor ID, a phone number of an immutable digital creator, and an immutable digital testimony ID (4120); and
sending, by the third-party immutable digital testimony requestor, the third-party request to an immutable digital testimony orchestrator (49100).

12. A method according to claim 4, further comprising:
creating an immutable digital testimony trail that identifies immutable digital testimony created along a path, by:
creating, by an immutable digital testimony orchestrator (1210), a map of an immutable digital testimony trail (3230) by identifying (i) one or more third-party immutable digital testimonies, (ii) one or more cameras, or (iii) a combination of both (i) and (ii), each along a path taken by a user during a user-predetermined time prior to an immutable digital testimony creation (6205);
identifying and visually indicating a location of (i) the one or more third-party immutable digital testimonies, (ii) the one or more cameras, or (iii) a combination of both (i) and (ii) (6220);
sending the map of the immutable digital testimony trail to a device of a creator of immutable digital testimony, the map to be associated with the immutable digital testimony local media stored on the device of the creator (69100, 6210); and recording on the immutable digital testimony authentication blockchain (69200), by the immutable digital testimony orchestrator:
- the immutable digital testimony trail associated with (i) an immutable digital testimony identifier (ID) and (ii) immutable digital testimony geodata, each associated with the creator of the immutable digital testimony local media, and
- one or more of an immutable digital testimony identifier corresponding to (i) the one or more third-party immutable digital testimonies, (ii) the one or more cameras, or (iii) both (i) and (ii), correspondingly.

13. The method of claim 12, further comprising:
- presenting a thumbnail of a specific immutable digital testimony ID (3190) on an immutable digital testimony gallery (2600) for the creator of the immutable digital testimony; and
- presenting the immutable digital testimony trail as part of metadata of the immutable digital testimony local media in the immutable digital testimony gallery (6100), wherein any one or a combination of (i) the one or more third-party immutable digital testimonies and (ii) the one or more cameras, each of which allow for the requesting of an immutable digital testimony view are identified with one or more icons, correspondingly (6231);
- initiating an immutable digital testimony viewing or immutable digital testimony sharing request for a corresponding immutable digital testimony (2220, 2230) by selecting any of the one or more icons (6110, 6120).

14. A system having one or more processors communicatively coupled to a plurality of sensors, and a non-transitory memory, the non-transitory memory storing instructions that when executed by the processor, control the system to create and view an immutable digital testimony, comprising:
- a first layer (1100) operating on a device (1110) having an immutable digital testimony device identifier (ID), wherein the immutable digital testimony device ID is a unique identifier of the creator device, the device configured to:
  - activate an immutable digital testimony creation operation;
  - authenticate a creator of an immutable digital testimony based on an immutable digital testimony creator ID, wherein the immutable digital testimony creator ID is a unique user identification created upon registering with an immutable digital testimony network (3100);
  - capture the immutable digital testimony device ID of the device used to create the immutable digital testimony (3100);
  - upon authentication of the creator, initiate an immutable digital testimony capture operation (3110) to:
    - activate one or more cameras associated with the device and cause the device to generate immutable digital testimony stream media (3120);
    - hash one or more frames of the immutable digital testimony stream media for the one or more cameras by applying a selected immutable digital testimony hashing scheme from a plurality of hashing schemes, thereby creating one or more immutable digital testimony stream hashes (3130, 3132);
    - form a live stream hash (3130, 3133) from the one or more immutable digital testimony stream hashes;
    - capture immutable digital testimony metadata (3140) to be recorded on an immutable digital testimony authentication blockchain;
    - transmit the immutable digital testimony stream media and the selected immutable digital testimony hashing scheme to a cloud server (3147, 39100), causing the selected immutable digital testimony hashing scheme and the immutable digital testimony stream media to be stored on the cloud server as immutable digital testimony cloud media;
    - retrieve one or more immutable digital testimony addresses (39110), each of the one or more immutable digital testimony addresses being (i) one or more cloud addresses on the cloud server, (ii) one or more distributed file system addresses (DFS addresses) on a distributed file system (DFS), or (iii) a combination of (i) and (ii), correspondingly, wherein each of the one or more immutable digital testimony addresses corresponds to (i) a location at which the immutable digital testimony cloud media is saved, the immutable digital testimony cloud media being at least a portion of the immutable digital testimony stream media, or (ii) a location allocated for saving the immutable digital testimony cloud media which is at least a portion of the immutable digital testimony stream media;
  - upon completion of the transmission:
    - encrypt the immutable digital testimony live stream media (3148) thereby creating encrypted immutable digital testimony live stream media, the encrypted immutable digital testimony live stream media being at least a portion of the immutable digital testimony stream media,
    - send to the DFS the encrypted immutable digital testimony live stream media (39100) to save the encrypted immutable digital testimony live stream media, and
    - receive from the DFS (39015) one or more immutable digital testimony DFS addresses corresponding to the location on the DFS where the immutable digital testimony stream media is saved, wherein each of the one or more immutable digital testimony DFS addresses corresponds to a location at which the encrypted immutable digital testimony live stream media has been saved; and
  - save the immutable digital testimony stream media on the device, to create immutable digital testimony local media (3149).

15. The system of claim 14, wherein the device is further configured to:
- select one or more frames of the immutable digital testimony local media corresponding to the same one or more frames of the immutable digital testimony stream media (3151);
- hash one or more frames of the selected one or more frames of the immutable digital testimony local media using the selected immutable digital testimony hashing scheme, thereby creating one or more immutable digital testimony local hashes (3152);
- form a local symbiotic hash (3153) from the one or more immutable digital testimony local hashes;
- send (39020) to a smart contract, the local symbiotic hash for validating against the live stream hash; and
- send (3160, 39030) to the smart contract, the live stream hash, the immutable digital testimony metadata, the one or more immutable digital testimony DFS addresses, and the one or more immutable digital testimony cloud addresses.

16. The system of claim 15, further comprising:
a third layer (1300) configured to:
select one or more frames of the immutable digital testimony cloud media corresponding to the same one or more frames of the immutable digital testimony stream media (3311);
hash one or more frames of the selected one or more frames of the immutable digital testimony cloud media using the selected immutable digital testimony hashing scheme, thereby creating one or more immutable digital testimony cloud hashes (3312);
form a cloud media hash (3313) from the one or more immutable digital testimony cloud hashes; and
send (39040), from the cloud server to the smart contract, the cloud media hash for validating against the live stream hash.

17. The system of claim 16, wherein the third layer (1300) is configured to:
create, by the smart contract, a creator token by combining the immutable digital testimony creator ID and the immutable digital testimony device ID (3331);
create, by the smart contract, an immutable digital testimony identifier (ID) (3332) by hashing the creator token with the live stream hash; and
compare, by the smart contract, the live stream hash, the local symbiotic hash, and the cloud media hash, and if a) the live stream hash mirrors the local symbiotic hash and b) the live stream hash mirrors the cloud media hash (33330):
create, by the smart contract, an immutable digital testimony hash by hashing the immutable digital testimony ID, the one or more immutable digital testimony cloud addresses, the immutable digital testimony metadata, the one or more immutable digital testimony DFS addresses, and the live stream hash (3380),
record, by the smart contract: the immutable digital testimony ID, the one or more immutable digital testimony cloud addresses, the immutable digital testimony metadata, the one or more immutable digital testimony DFS addresses, the immutable digital testimony hash, the live stream hash on the immutable digital testimony authentication blockchain (33340), and user permissions on an immutable digital testimony authentication blockchain (33350),
send the user permissions to an immutable digital testimony orchestrator (1210) to create, based on the user permissions, a log entry indicating whether a corresponding immutable digital testimony creator ID has any rights over the immutable digital testimony cloud media that is associated with a specific immutable digital testimony ID (39300), and
record, by the smart contract, the immutable digital testimony ID and immutable digital testimony hash on a public blockchain (39400, 33360).

18. The system of claim 16, wherein the third layer (1300) is further configured to:
if a) the live stream hash and the local symbiotic hash do not match or b) the live stream hash and a cloud media hash do not match:
create an alternate immutable digital testimony (3180) by saving (3190) the immutable digital testimony local media to the DFS (39500) and the cloud server (39511) and retrieving the one or more alternate immutable digital testimony DFS addresses (39510) and the one or more alternate immutable digital testimony cloud addresses (39512), correspondingly, and
provide a notification, by the smart contract, that the immutable digital testimony stream media was corrupted during the transmission or storage process (39050).

19. The system of claim 18, wherein the device is further configured to:
send (3191, 39060) the immutable digital testimony metadata, the live stream hash, the local symbiotic hash, the one or more alternate immutable digital testimony cloud addresses, and the one or more alternate immutable digital testimony DFS addresses, to the smart contract.

20. The system according to claim 19, wherein the smart contract is further configured to:
receive the alternate immutable digital testimony metadata, the live stream hash, the local symbiotic hash, and the one or more alternate immutable digital testimony DFS addresses (39060);
create an alternate creator token by combining the immutable digital testimony creator ID and the immutable digital testimony device ID (3341);
create an immutable digital testimony alternate identifier (ID) (3342) by hashing the alternate creator token with the live stream hash and adding ALT at the end of the immutable digital testimony alternate ID;
create the alternate immutable digital testimony hash by hashing the immutable digital testimony alternate ID, the immutable digital testimony metadata, the one or more alternate immutable digital testimony cloud addresses, the one or more alternate immutable digital testimony DFS addresses, the local symbiotic hash, and the live stream hash (3349);
record the immutable digital testimony alternate ID, the immutable digital testimony metadata, the one or more alternate immutable digital testimony cloud addresses, the one or more alternate immutable digital testimony DFS addresses, the live stream hash, the local symbiotic hash, and the alternate immutable digital testimony hash to the immutable digital testimony authentication blockchain (3343);
record user permissions corresponding to the immutable digital testimony alternate ID on the authentication blockchain (3344) and sending the user permissions (39600) to an immutable digital testimony orchestrator (1210) to update log entries of the immutable digital testimony orchestrator (1210); and
record the alternate immutable digital testimony ID and alternate immutable digital testimony hash on the public blockchain (3345, 39700).

21. The system according to claim 18, wherein the immutable digital testimony orchestrator (1210) is configured to:
receive user viewing permissions to an immutable digital testimony corresponding to the immutable digital testimony alternate ID (39600); and
create a local ledger of permission details based on the user permissions.

22. The system according to claim 14, further comprising:
a requestor device (1100-2) configured to:
authenticate a third-party immutable digital testimony requestor;

initiate from an immutable digital testimony creator, a third-party request, the third-party request being any one or more of (4110):
    an immutable digital testimony request, requesting to create and share a new immutable digital testimony (2210),
    an immutable digital testimony view request, requesting permission to view an existing immutable digital testimony of the creator (2220), or
    an immutable digital testimony share request, requesting permission to share an existing immutable digital testimony of the creator with another immutable digital testimony network user (2230);

create the third-party request by combining any one or a combination of: the third-party immutable digital testimony requestor ID, a phone number of an immutable digital creator, and an immutable digital testimony ID (4120); and send the third-party request to an immutable digital testimony orchestrator (49100).

\* \* \* \* \*